(12) United States Patent
Page

(10) Patent No.: US 8,439,319 B2
(45) Date of Patent: May 14, 2013

(54) STANDALONE, MOBILE AND ADJUSTABLE STAND AND TRAY

(75) Inventor: Denis Page, Ottawa (CA)

(73) Assignee: Denis Page, Ottawa (CA)

( * ) Notice: Subject to any disclaimer, the term of this patent is extended or adjusted under 35 U.S.C. 154(b) by 260 days.

(21) Appl. No.: 12/781,403

(22) Filed: May 17, 2010

(65) Prior Publication Data

US 2010/0294899 A1 Nov. 25, 2010

(51) Int. Cl.
*F16M 13/00* (2006.01)

(52) U.S. Cl.
USPC ............... 248/125.8; 248/921; 248/125.1; 248/918

(58) Field of Classification Search ........... 248/125.8, 248/125.1, 125.2, 921, 286.1, 284.1, 279.1, 248/281.11, 292.11, 918, 181.2, 920; 16/366, 16/369, 286; 403/119, 150, 151
See application file for complete search history.

(56) References Cited

U.S. PATENT DOCUMENTS

| | | | | |
|---|---|---|---|---|
| 4,691,886 A | * | 9/1987 | Wendling et al. | 248/183.1 |
| 4,848,387 A | * | 7/1989 | Hon | 137/1 |
| 5,799,917 A | * | 9/1998 | Li | 248/284.1 |
| 5,947,429 A | * | 9/1999 | Sweere et al. | 248/123.11 |
| 6,076,785 A | | 6/2000 | Oddsen, Jr. | |
| 6,478,274 B1 | * | 11/2002 | Oddsen, Jr. | 248/274.1 |
| 6,736,364 B2 | * | 5/2004 | Oddsen, Jr. | 248/585 |
| 6,854,698 B2 | * | 2/2005 | Oddsen, Jr. | 248/274.1 |
| 6,863,253 B2 | * | 3/2005 | Valentz et al. | 248/519 |
| 6,983,917 B2 | * | 1/2006 | Oddsen, Jr. | 248/274.1 |
| 7,516,923 B2 | | 4/2009 | Rossini | |
| 7,540,457 B2 | * | 6/2009 | Oddsen et al. | 248/278.1 |
| 7,793,897 B2 | * | 9/2010 | Wang et al. | 248/125.2 |
| 7,922,132 B2 | * | 4/2011 | Saez et al. | 248/124.1 |
| 2002/0017595 A1 | | 2/2002 | Koyanagi | |
| 2007/0095993 A1 | * | 5/2007 | Yamamoto | 248/284.1 |
| 2008/0237439 A1 | * | 10/2008 | Oddsen | 248/631 |

* cited by examiner

*Primary Examiner* — Terrell McKinnon
*Assistant Examiner* — Monica Millner

(57) ABSTRACT

The invention is a self-supporting, mobile or fixed, adjustable stand for items such a computer keyboard, mouse or laptop computer for use while sitting on a recliner, sofa or chair, standing, sitting or kneeling on the floor. The assembly consists of an articulated arm mechanism with supporting gas spring piston that allows the tray to be raised or lowered effortlessly. The arm assembly swivels sideways to allow the user to sit or stand more freely. The tray assemblies also swivel for added practicality. The stand may be movable or fastened to a floor or another firm location. Movable base assembly options are included and four adjustable foot pegs or casters may be used to level the stand perfectly to the floor and to improve the mobility. The stand can be used with a wired or wireless keyboard and mouse when viewing a large monitor or television from a distance.

1 Claim, 61 Drawing Sheets

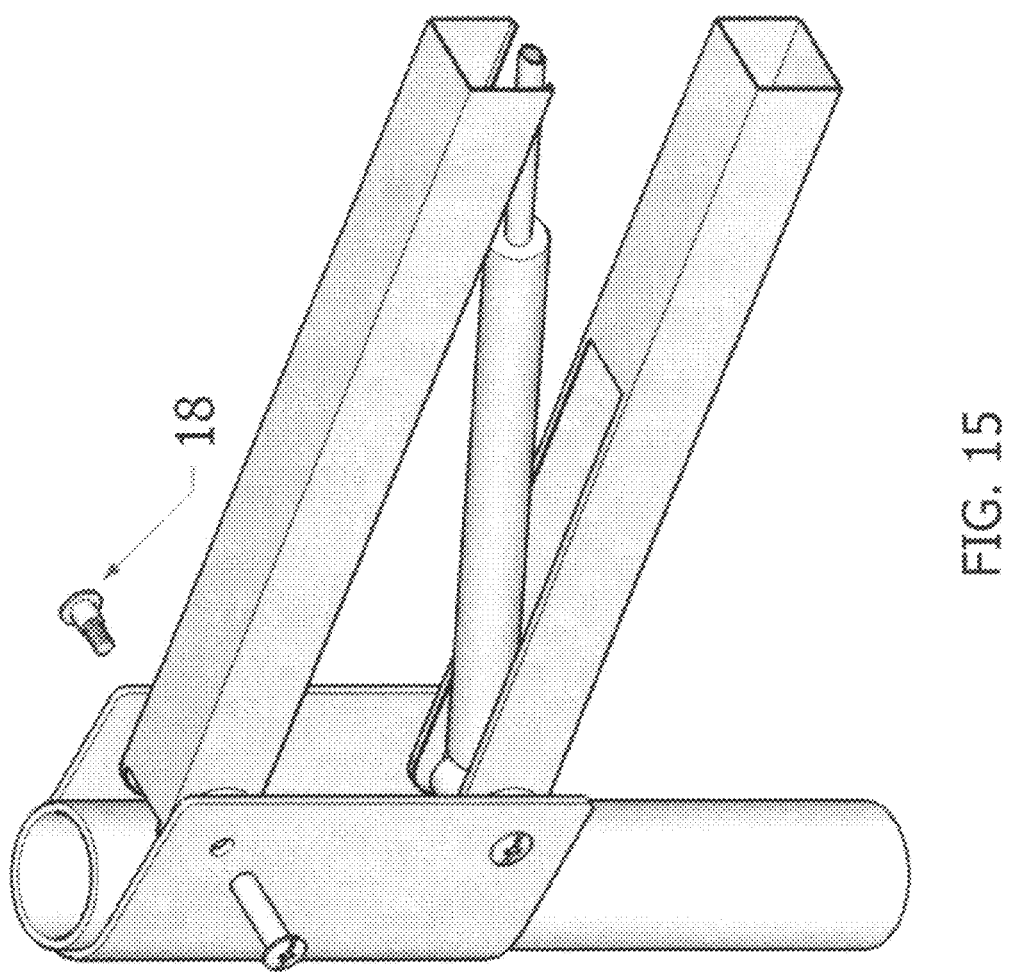

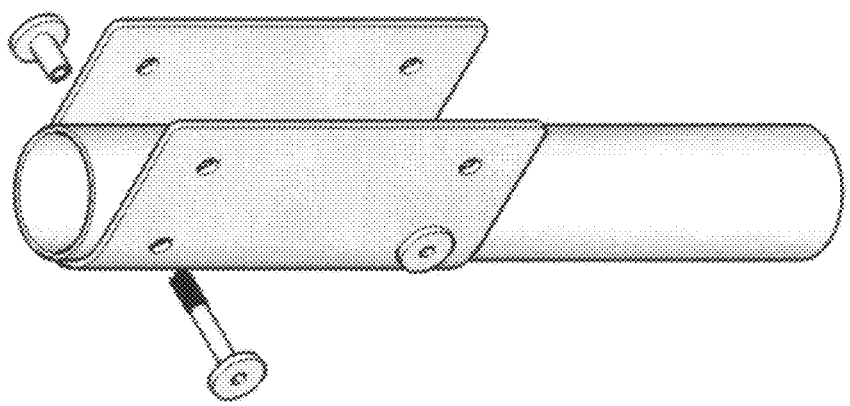

11

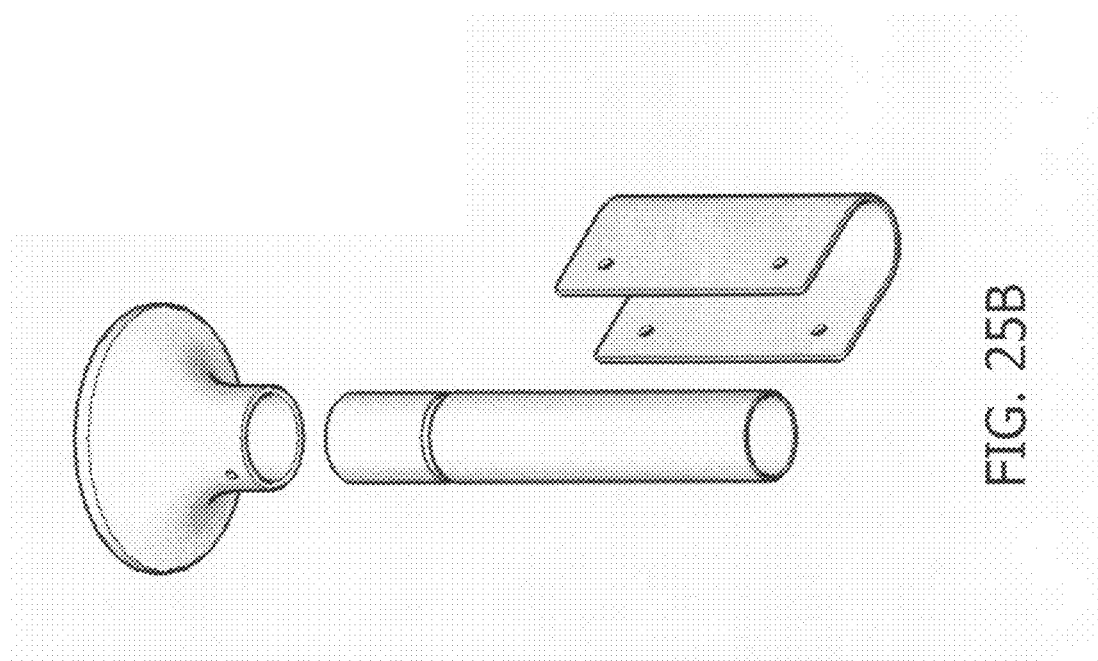

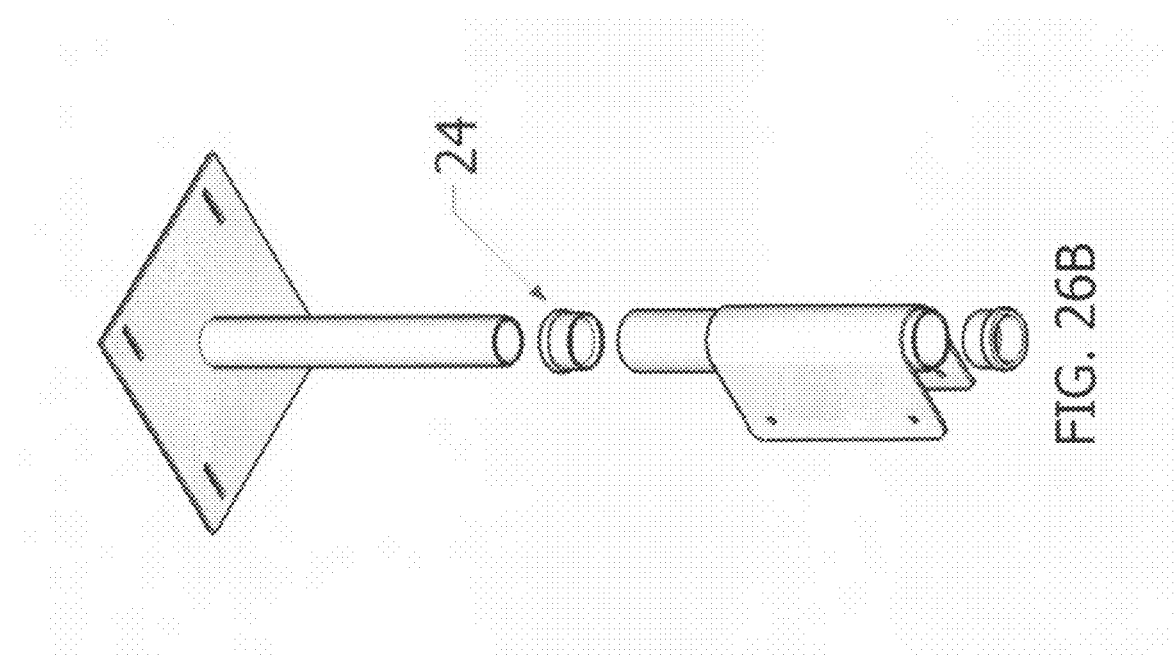

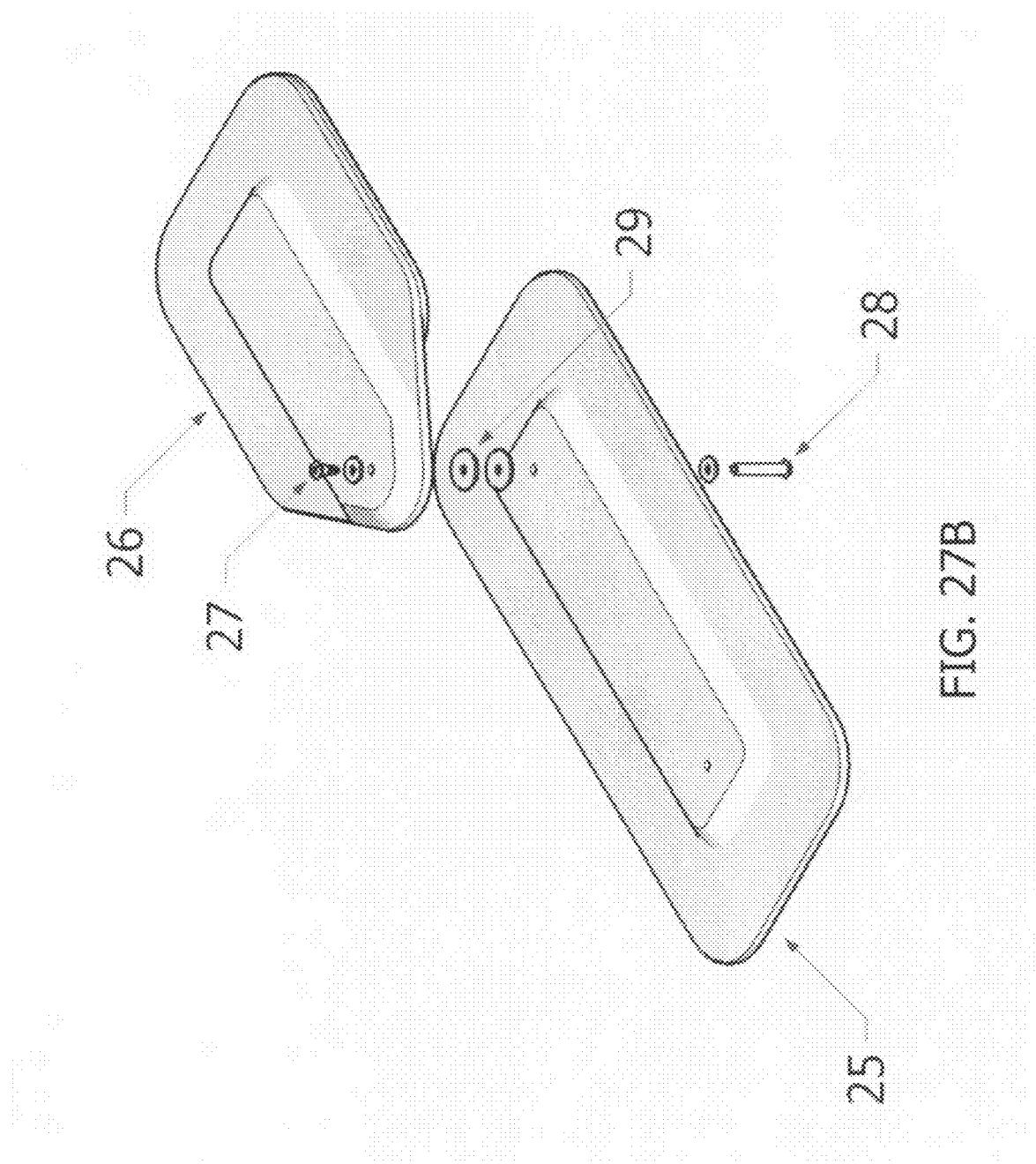

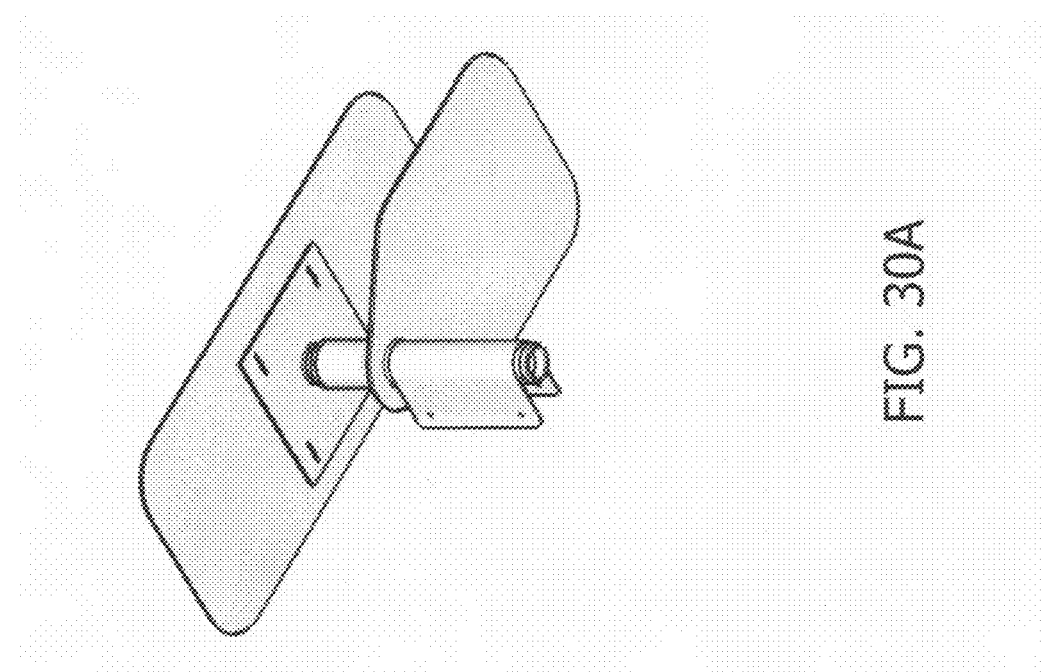

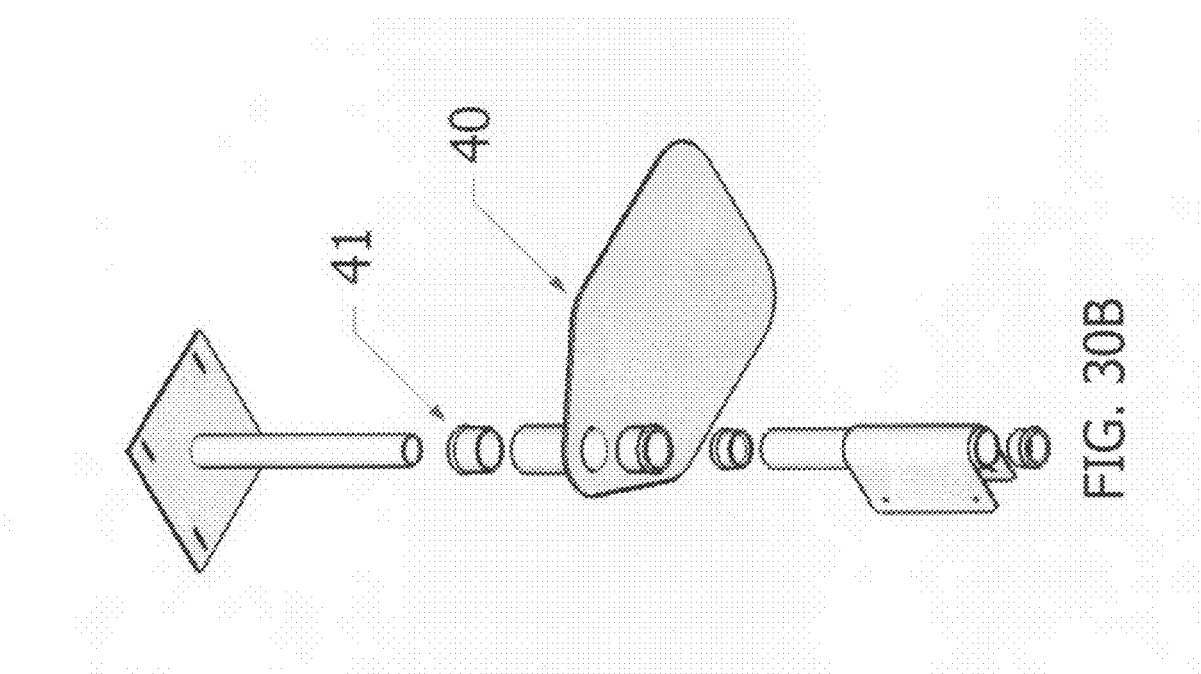

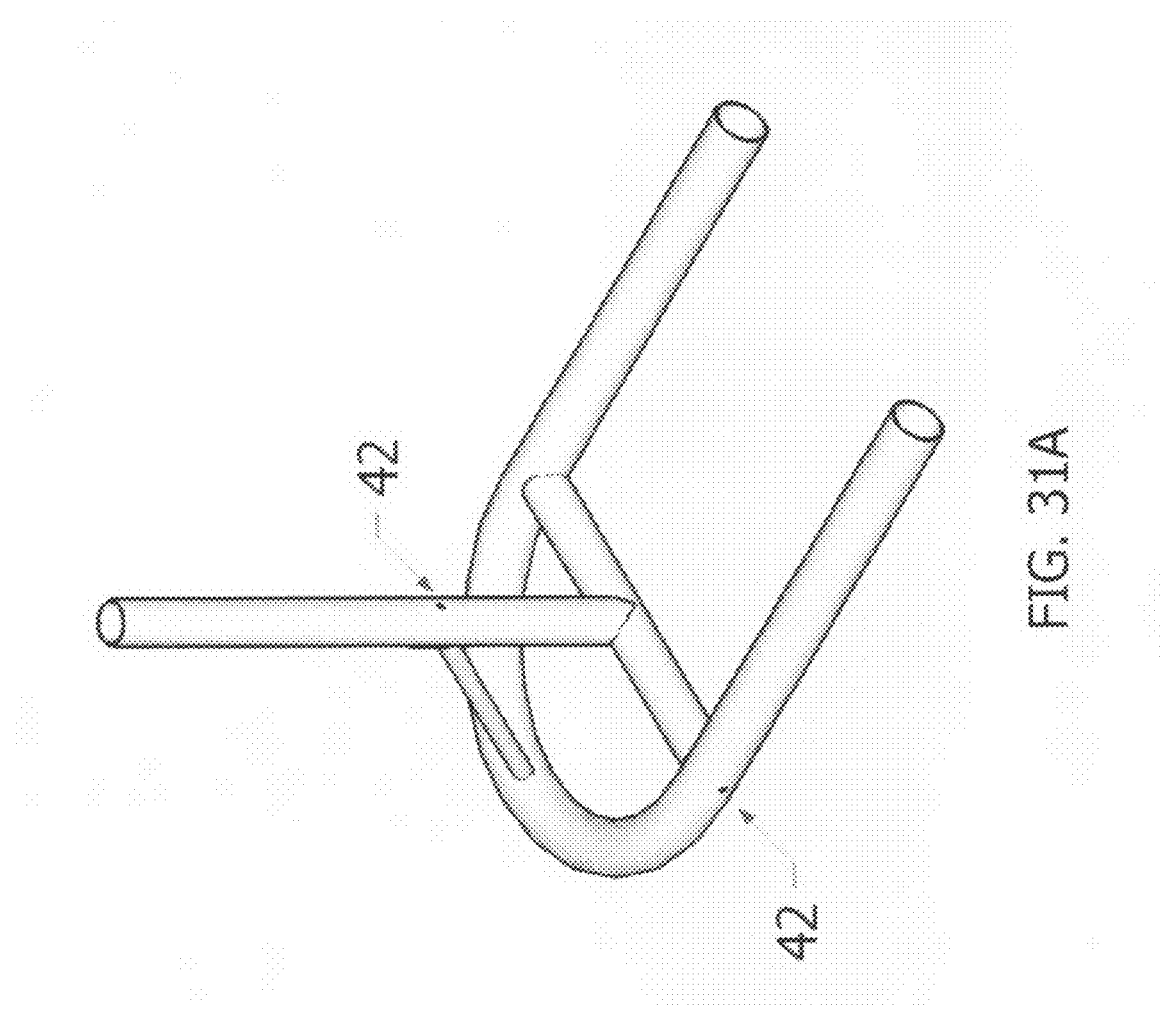

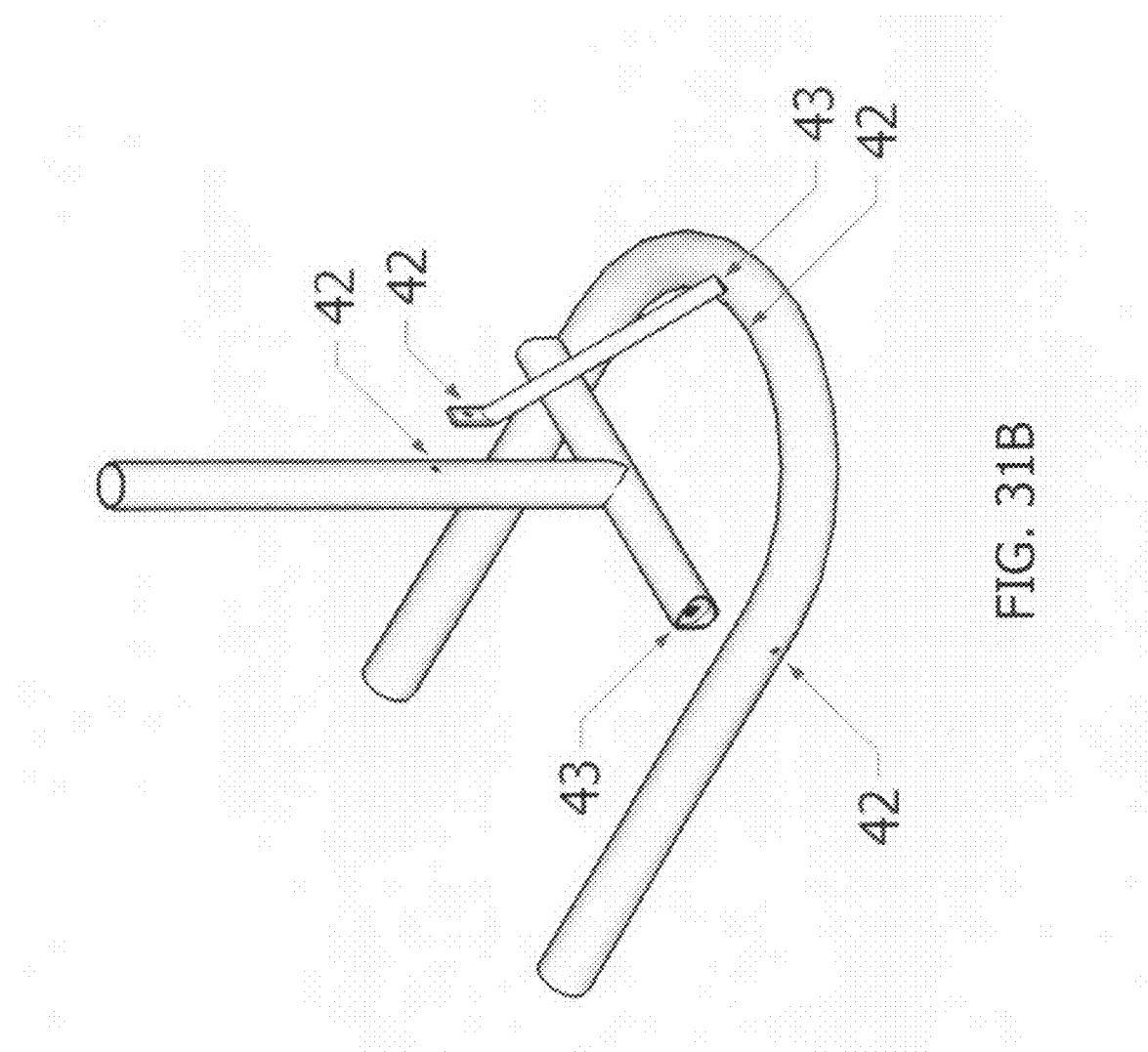

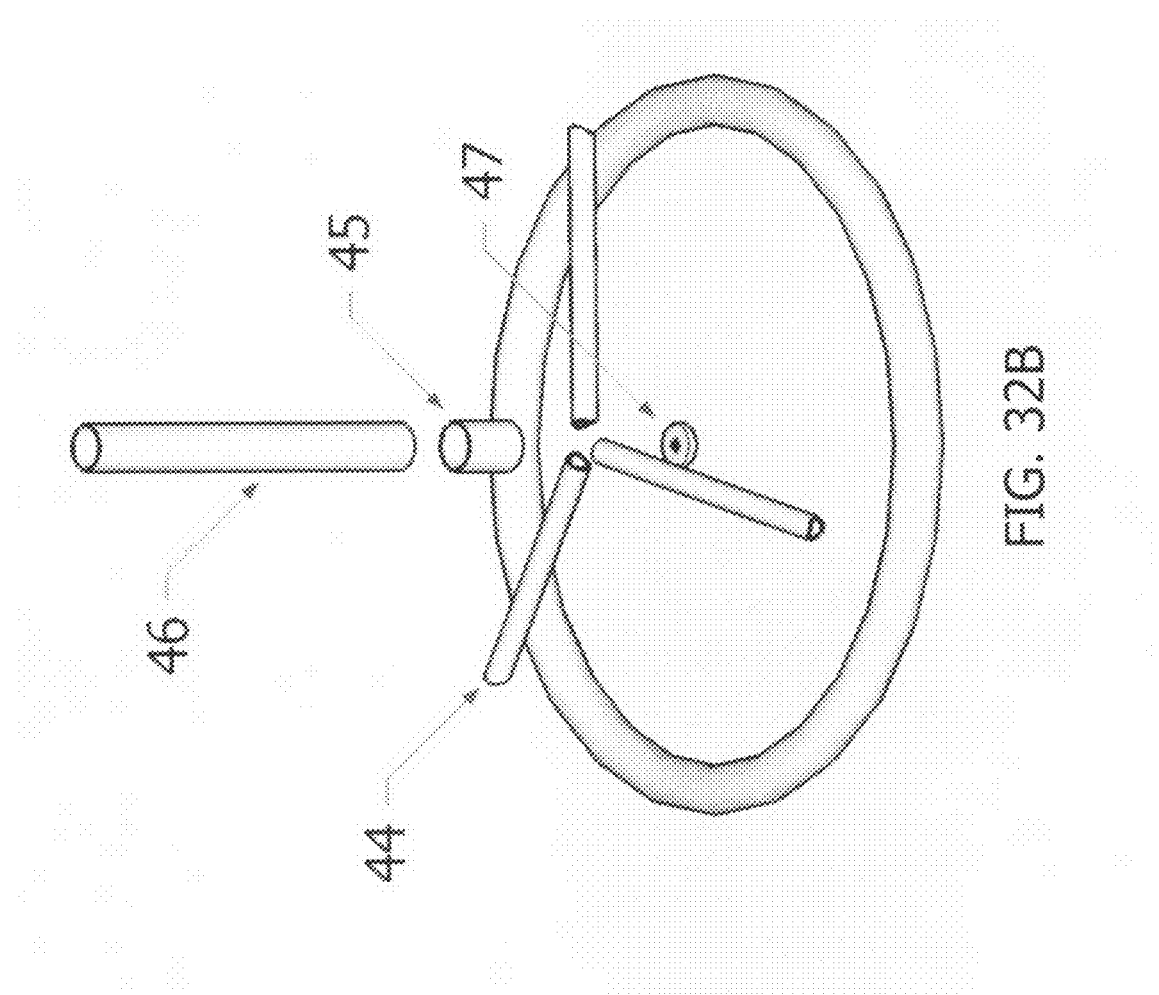

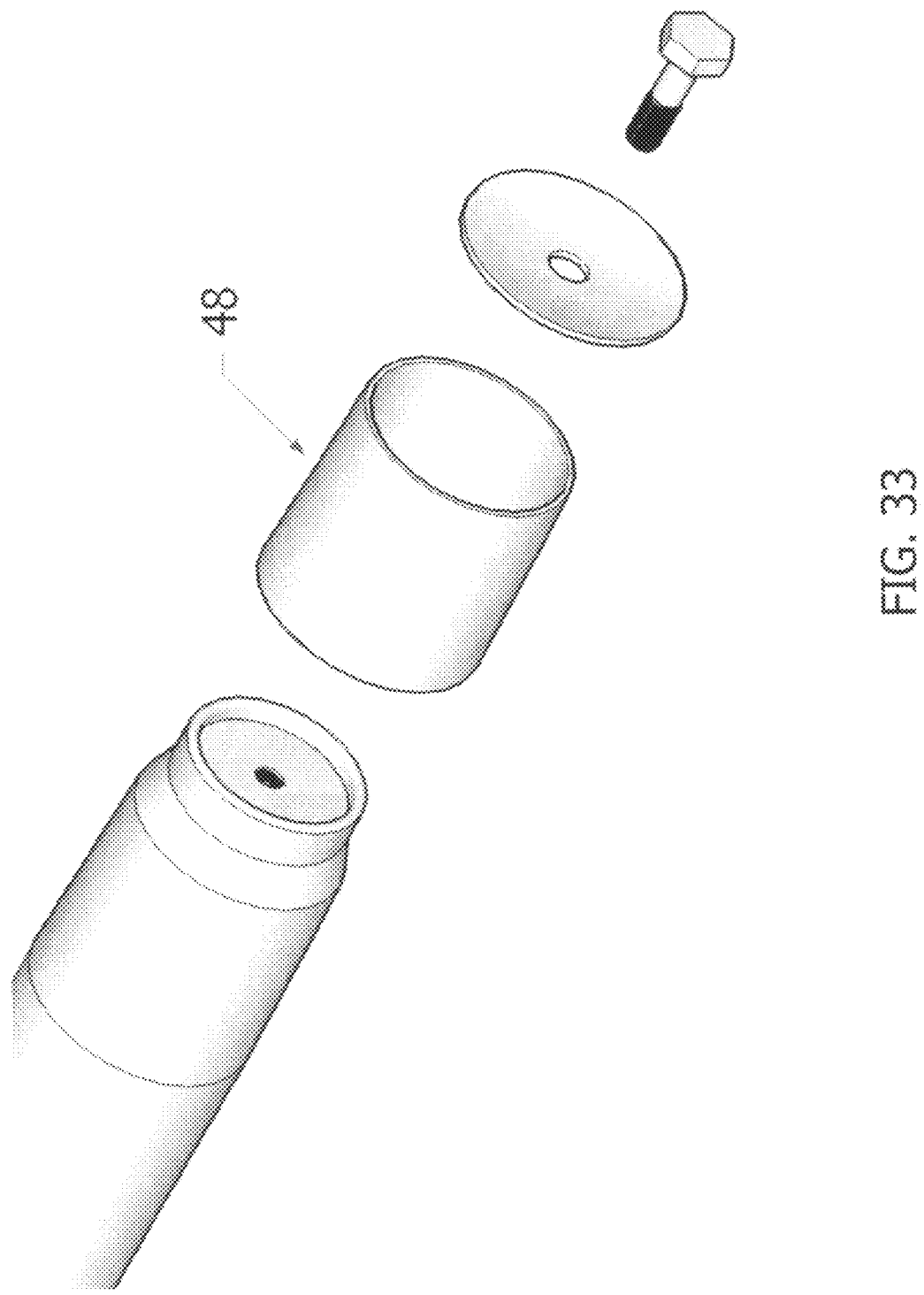

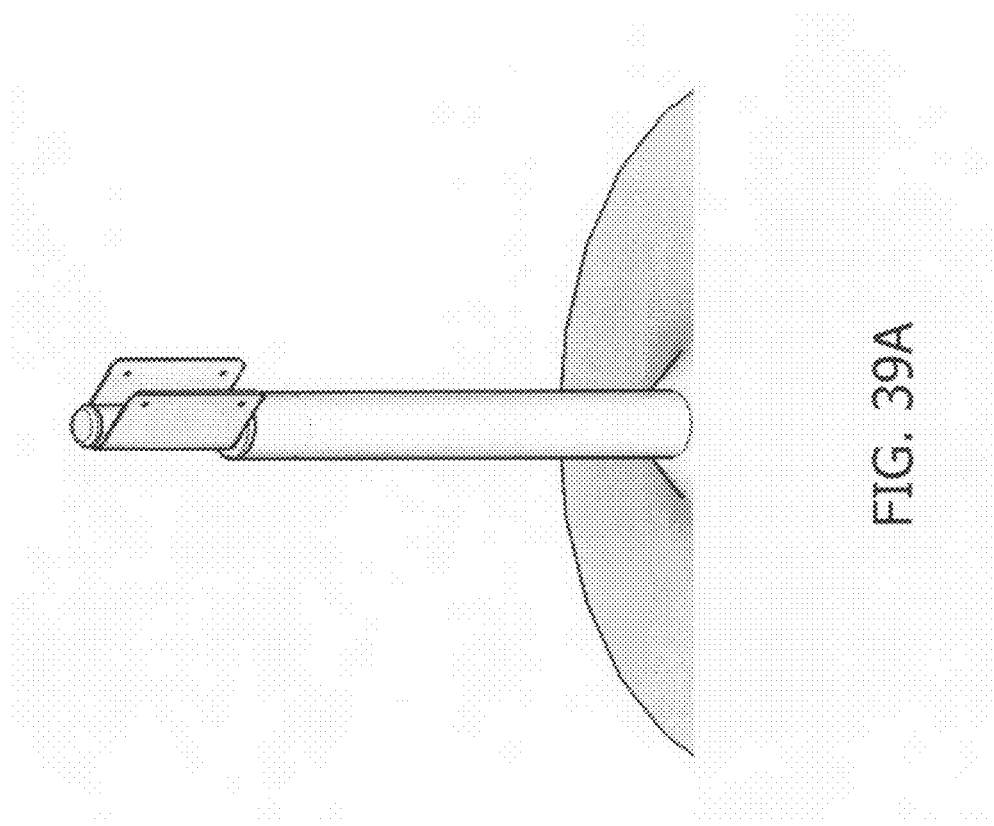

STANDALONE, MOBILE AND ADJUSTABLE STAND AND TRAY

CROSS-REFERENCE TO RELATED APPLICATIONS

Reference 1

Patent Application No: Canada 2666278
Title: "Standalone, Adjustable Keyboard and Mouse Tray and Stand".
Filling Date May 19, 2009.

Reference 2

Patent Application No: Canada 2697464
Title: "Adjustable Stand for Keyboard and Mouse".
Filling Date Aug. 28, 2009.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

Computer keyboard and mouse trays have long been known and widely used in the context of an office environment where assemblies are used to store a keyboard and mouse under a desk and be retrieved when required. No assemblies have been designed to date where a keyboard and mouse may be used freestanding in other locations such as a living room or a recreation room where a computer is used with a large monitor or television. The same is true for laptop computers.

BRIEF SUMMARY OF THE INVENTION

This invention is a convenient means to allow the user to access and use the keyboard, mouse or laptop computer while sitting on a recliner, chair or sofa, standing, sitting or kneeling on the floor.

The invention may be used in a performing arts and rehearsing environment, holding a keyboard, mouse or laptop computer handy while people are playing a musical instrument.

The invention may be used for other purposes such as keeping tools or a keyboard at arms reach in a surgical, dental or mechanical work place for example.

The invention may also be used a living room dinner tray.

BRIEF DESCRIPTION OF THE SEVERAL VIEWS OF THE DRAWING

FIG. 15 is a partially exploded view of the arm assembly constructed with shoulder screw shaft assembly.

FIG. 20A is a projection view of the U-shaped bracket and the lower bracket post fastened with binding posts and barrel nuts.

FIG. 25B is an exploded view of the same assembly.

FIG. 26B is an exploded view of the same assembly.

FIG. 27B is an exploded underside view of the same assembly.

FIG. 30A is a parallel projection underside view of the side tray with tube and side tray bearings demonstrating the assembly with the top tray post and bracket post.

FIG. 30B is an exploded view of the same assembly.

FIG. 31A is a parallel projection view of the U-shaped tube base assembly.

FIG. 31B is an exploded backside view of the same assembly.

FIG. 32B is an exploded view of the same assembly.

FIG. 33 is and exploded view of the conical end of the base post, convex washer and bolt showing assembly with the base unit.

FIG. 39A is a parallel projection view of the base post, flanged bearing, washer and bracket post.

DETAILED DESCRIPTION OF THE INVENTION

The following is a detailed description of a standalone, mobile or fixed, adjustable stand assembly.

In a preferred embodiment, the invention can be modified for a computer keyboard and mouse stand, a portable computer stand or a stand with tray for tools or instruments.

Figure 12:
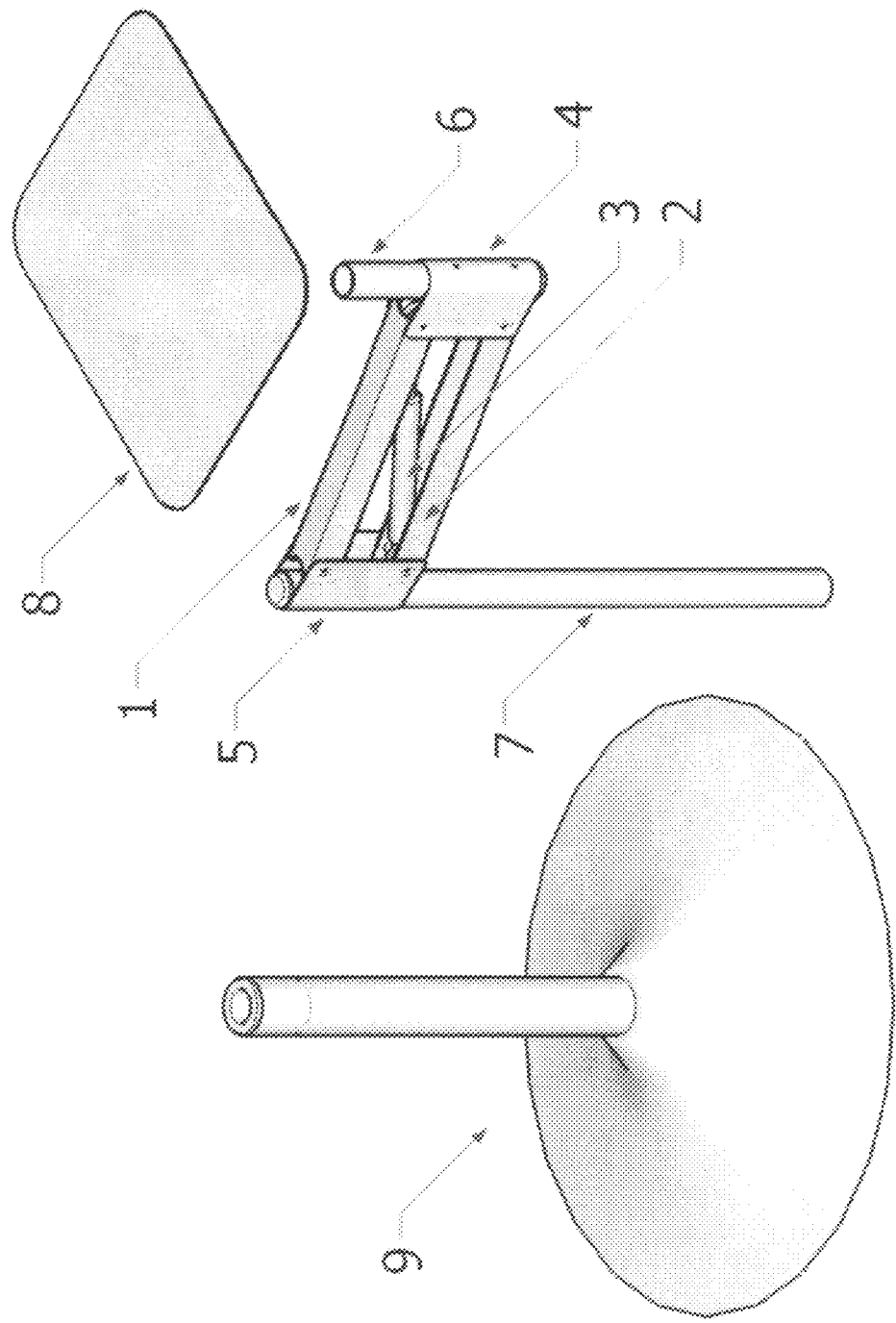
FIG. 12 is an exploded view of the stand assembly identifying its components.

As indicated in FIG. 12 and Reference 1, the invention consists of an upper arm (1), a lower arm (2), a piston (3), an upper bracket (4), a lower bracket (5), an upper bracket post (6), a lower bracket post (7), a tray assembly (8) and a base assembly (9).

Arms

Figure 13:
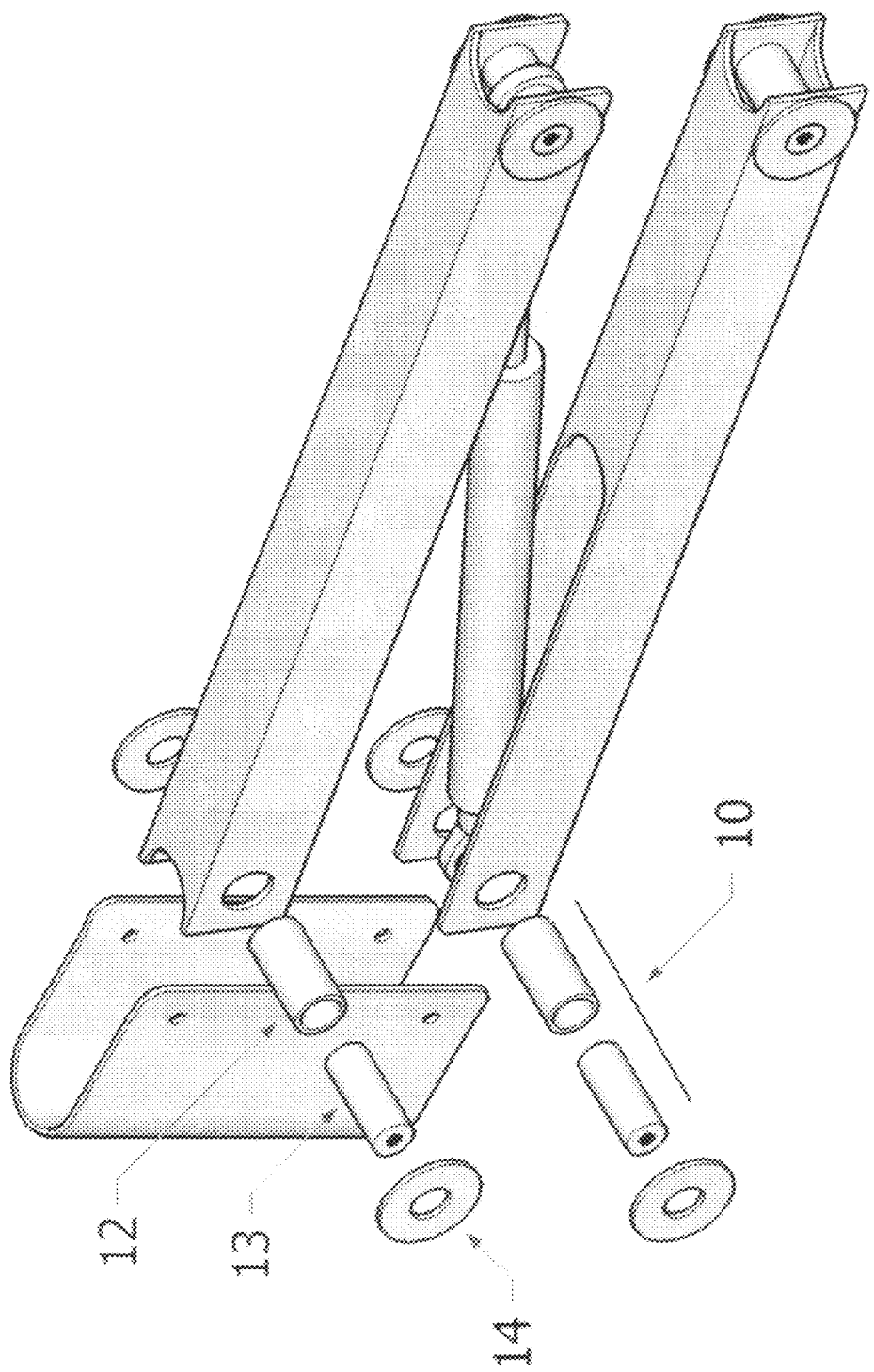
FIG. 13 is an exploded view of the arm assembly constructed with the sleeve shaft assembly.

As indicated in FIG. 13 and Reference 1, the two said arms are constructed from square metal tube with holes drilled on opposite sides at both extremities and an opening at one extremity that runs down the length of the tube up to the middle. The holes allow for the shaft assembly to be inserted through each arm providing a rotating motion for the arm around the shaft assembly. The slot allows for the said piston to position itself into the tube opening as the articulated arm assembly extends to its highest position. The material used for the arms is sufficiently thick and rigid to minimize torsion in the arm assembly.

As indicated in FIG. 13 and Reference 2, the two said arms may be arched at both extremities as a safety precaution preventing that a finger be inserted in the assembly and accidentally crushed while the arm assembly articulates.

As indicated in Reference 2, the two said arms may be constructed from rectangular tubing, circular tubing, U-channel, I-channel or flat bar piece of metal, plastic or wooden material.

The arms are an essential component of the invention.

Brackets

Figure 20B:
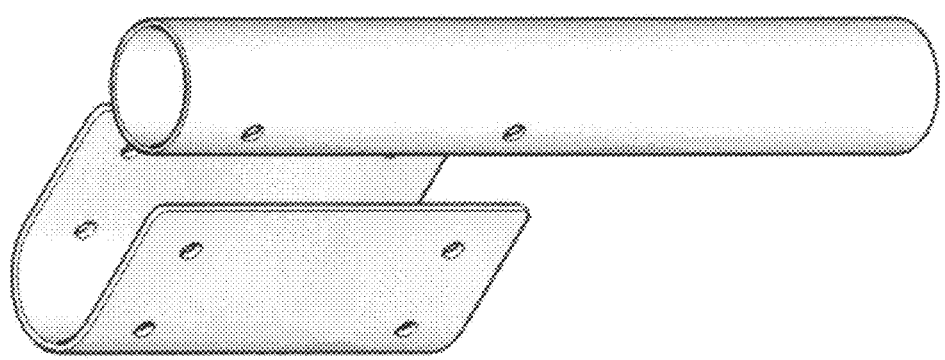
FIG. 20B is an exploded view of the same assembly.

As indicated in FIG. 13 and Reference 1, the said brackets are constructed from a rectangular piece of sheet metal bent along the centerline to form a semi-circle U-shape with straight and equal, extending parallel walls. The sheet has a hole in each corner at equal distance from the bending center line to accommodate the shaft assembly (10). As shown in FIG. 20A and FIG. 20B, the sheet also has two holes on both sides of the bending center line, also at equal distance from the bending center line to allow for fastening to the said bracket post using binding posts with barrel nuts.

Figure 21A:
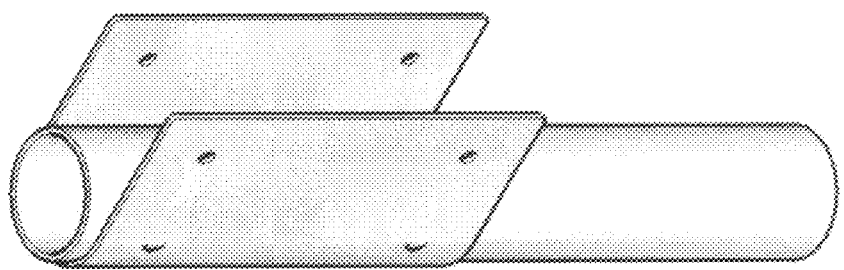
FIG. 21A is a projection view of the U-shaped bracket and the lower bracket post fastened with slanted notches.
Figure 21B:
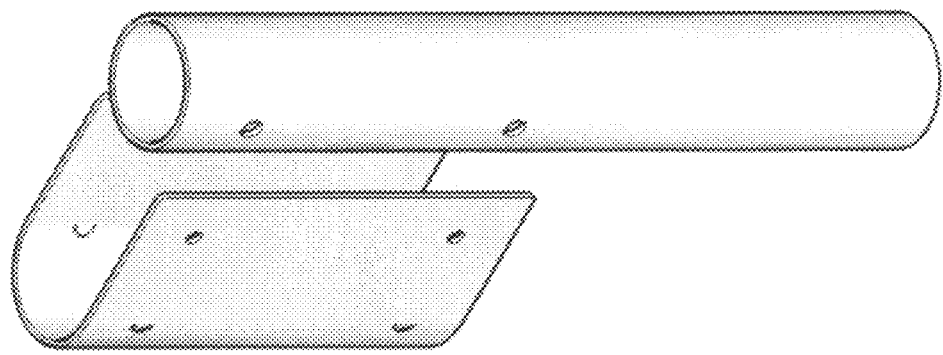
FIG. 21B is an exploded view of the same assembly.

As indicated in FIG. 21A, FIG. 21B and Reference 2, the said brackets may be punched with two half-circle slanted notches rather than the said binding post holes for fastening to the said bracket posts. The orientation and position of the notches is chosen such that the slant will widen the bracket as it is pushed and snapped into position onto the bracket post with the notches mating into the corresponding holes.

Figure 22A:
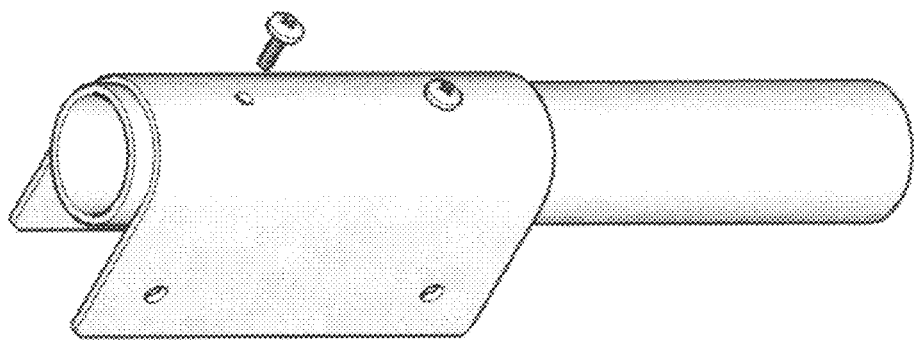
FIG. 22A is a projection view of the U-shaped bracket and the lower bracket post fastened with regular screws.
Figure 22B:
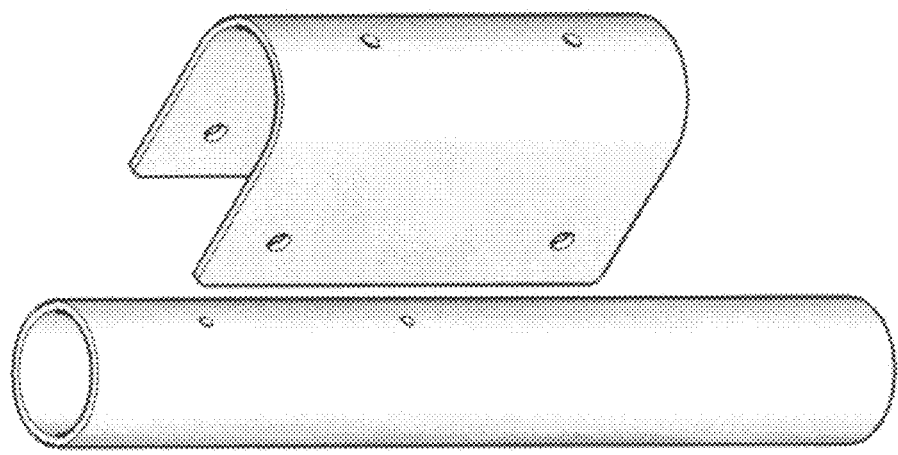
FIG. 22B is an exploded view of the same assembly.

Referring to FIG. 22A and FIG. 22B, the said brackets may be fastened to the said bracket posts using two screws into threaded holes in the post rather than the said notches or binding posts.

Figure 23:
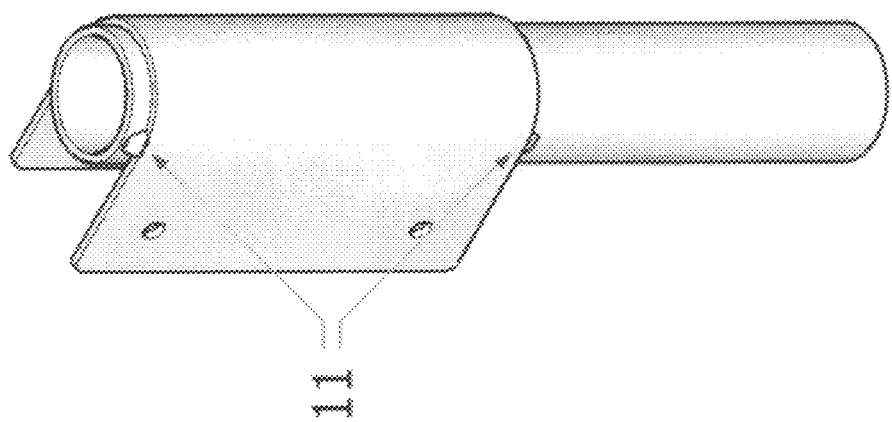
FIG. 23 is a projection view of the U-shaped bracket and the lower bracket post fastened by welding.

Referring to FIG. 23, the said brackets may be welded to the said bracket posts rather than the said fasteners. Weld locations (11) may be used for spot welding on both sides.

As indicated in Reference 2, the said brackets may be constructed from a plastic or wooden material rather than metal. The brackets may also be constructed of a rectangular U-shape part rather than circular.

The said brackets are an essential component of the invention in the sense that they provide the vertical elements of the articulated parallelogram of the invention with a rotating function for the said arms. The brackets may be constructed in a variety of ways or even be part of a different assembly.

Shaft Assembly

As indicated in FIG. 13 and Reference 2, sleeves (12) and threaded bearings (13) are used to assemble the said arms and brackets together. Bolts are used to fasten the threaded bearings to the brackets. The sleeves are constructed of a rigid, circular metal or plastic tube with smooth inner surface and are fitted tightly into the said arm holes. The threaded bearings are metal or plastic cylinders having a smooth outer surface with threaded inner surface and are positioned inside the sleeves. The sleeves are slightly shorter than the threaded bearings but equal or longer than the arm width. The outer round surface of the threaded bearing provides a low-friction rotating motion along the inner surface of the sleeve.

Referring to FIG. 13, washers (14) are used between the said arms and brackets to provide additional friction to the said articulating arm assembly allowing a greater range of item weight that can be added to the said trays. The friction washer is constructed of a slightly flexible material such as nylon or Teflon. The washer rests perfectly flat between the inside surface of the said bracket and the combined surface of the said arm side and sleeve end. The threaded bearing, being slightly longer than the sleeve forms a gap with the arm surface. This gap is chosen to be less than the thickness of the washer, thus providing a controlled friction as the arm assembly articulates.

Figure 14A:
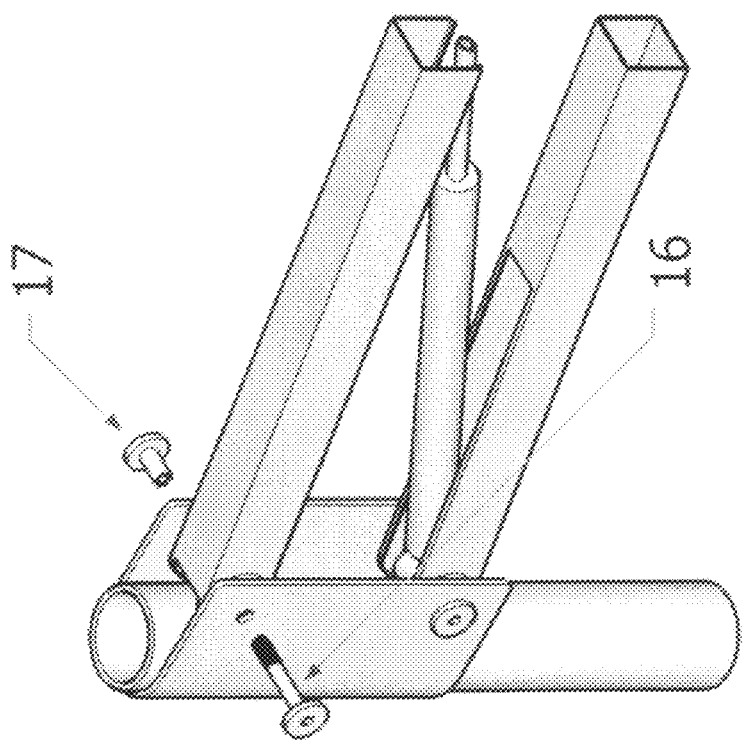
FIG. 14A is a projection view of the arm assembly constructed with binding post with thrust bearings shaft assembly.
Figure 14B:
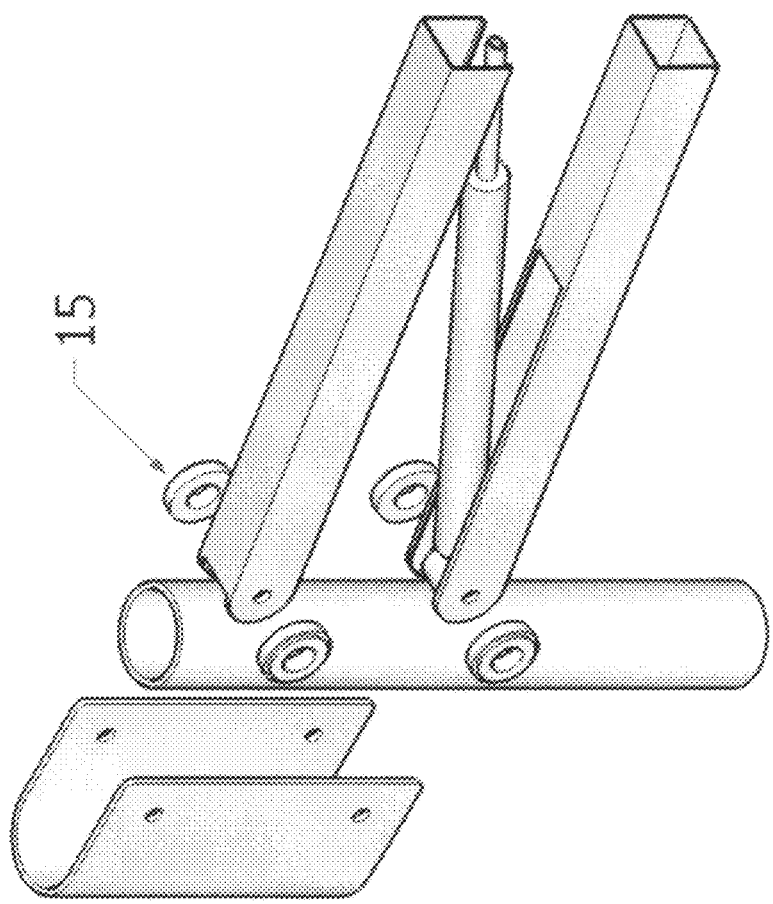
FIG. 14B is an exploded view of the same assembly.

As indicated in FIG. 14A, FIG. 14B and Reference 1, four un-ground banded thrust bearings (15), binding posts (16) and barrel nuts (17) are used rather than the said sleeves and threaded bearings. The thrust bearings with fasteners allow for a very tight assembly, preventing any movement of loose parts or twist and provide very low friction of the articulation movement. Referring to FIG. 15, shoulder screws (18) are used rather than the said binding posts. The shoulder screw and barrel nut together provide a better, more constant and controlled fastening pressure with fixed mating length.

For each of the four rotating points, the use of the binding post, shoulder screw and sleeves is mutually exclusive and the use of the thrust bearing and the friction washer is also mutually exclusive. All other permutations are possible however. For example, the shoulder screw and barrel nut may be used with the friction washer or the thrust bearing and the sleeves with threaded bearing may also be used with the friction washer or the thrust bearing.

The said shaft assembly is an essential component of the invention although it may be constructed is several different ways.

Piston Assembly

Figure 16:
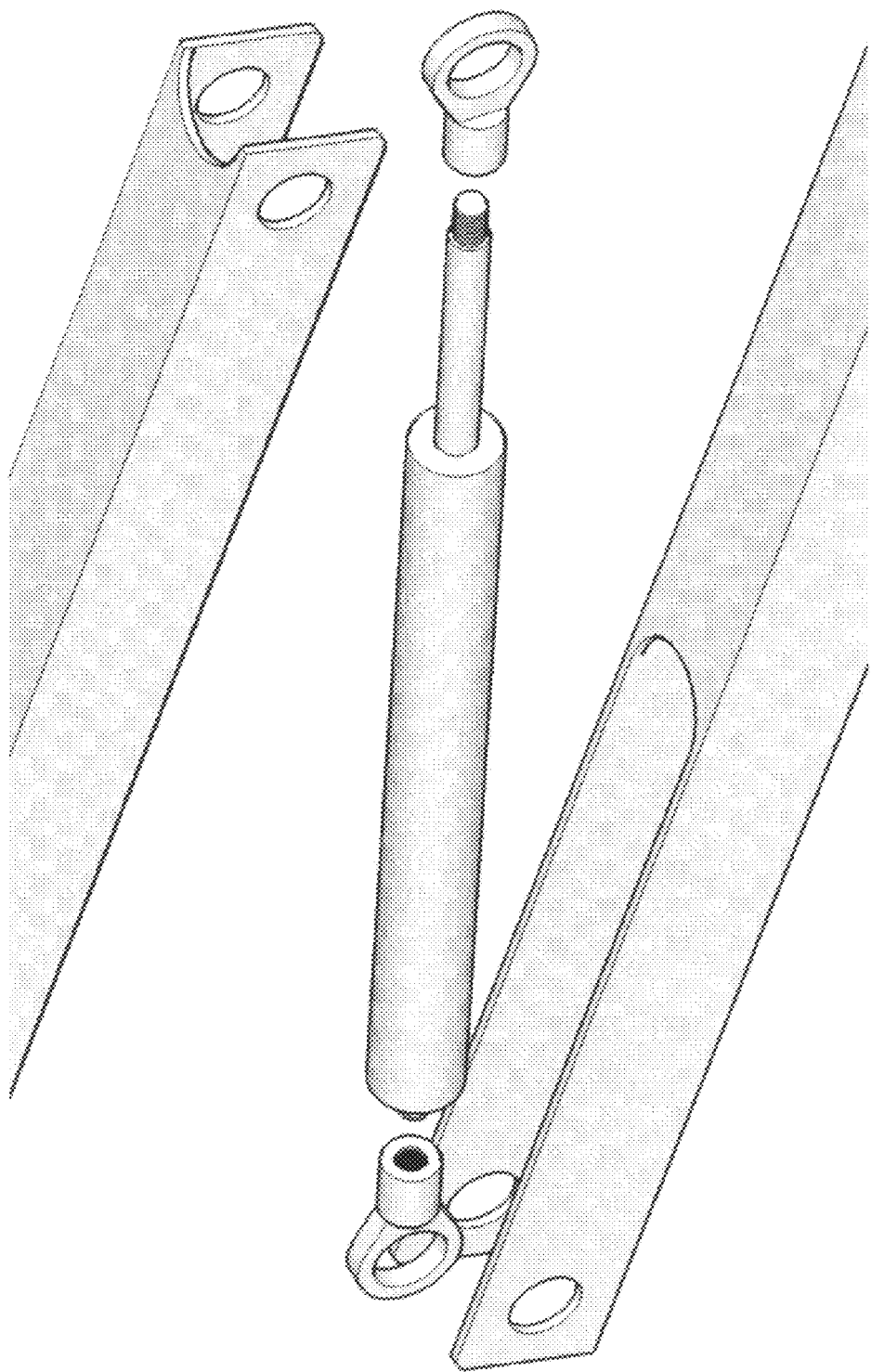
FIG. 16 is an exploded view of the arm assembly demonstrating the piston end fittings.

As indicated in FIG. 16 and Reference 1, the piston assembly is a gas spring piston equipped with eyelet piston end fittings at both ends. The piston applies a sufficient amount of force to hold the said tray(s) in a raised position in addition to the weight of items that are placed on the tray.

As indicated in FIG. 16 and Reference 2, the said piston consists of a rod and an outer, sliding cylinder with inner compressed gas or inner or outer compression spring.

The said piston end fittings may also be or press-fitted or snapped onto the said piston ends.

As indicated in FIG. 16 and Reference 2, the said piston end fittings are eyelets threaded to match the said piston ends and are positioned around the said shaft assembly. Each of the two arms accommodates one piston end fitting at one extremity that rotates freely around the shaft assembly.

The said piston end fittings are constructed of plastic or metal. The fittings may also be U-shaped, plastic clips rather than eyelets that snap onto the said shaft assembly from the end of the fitting or from the side, allowing the piston to be fitted into a pre-assembled arm assembly.

The piston assembly is a novel and important component of the invention although not entirely essential. It is possible to construct a tray with stand with the said articulated arm assembly without a piston. With a proper amount of friction in the articulated arm shaft assemblies it is possible to construct a useful and practical stand without the piston assembly.

Arm Articulation Locking

Figure 17:
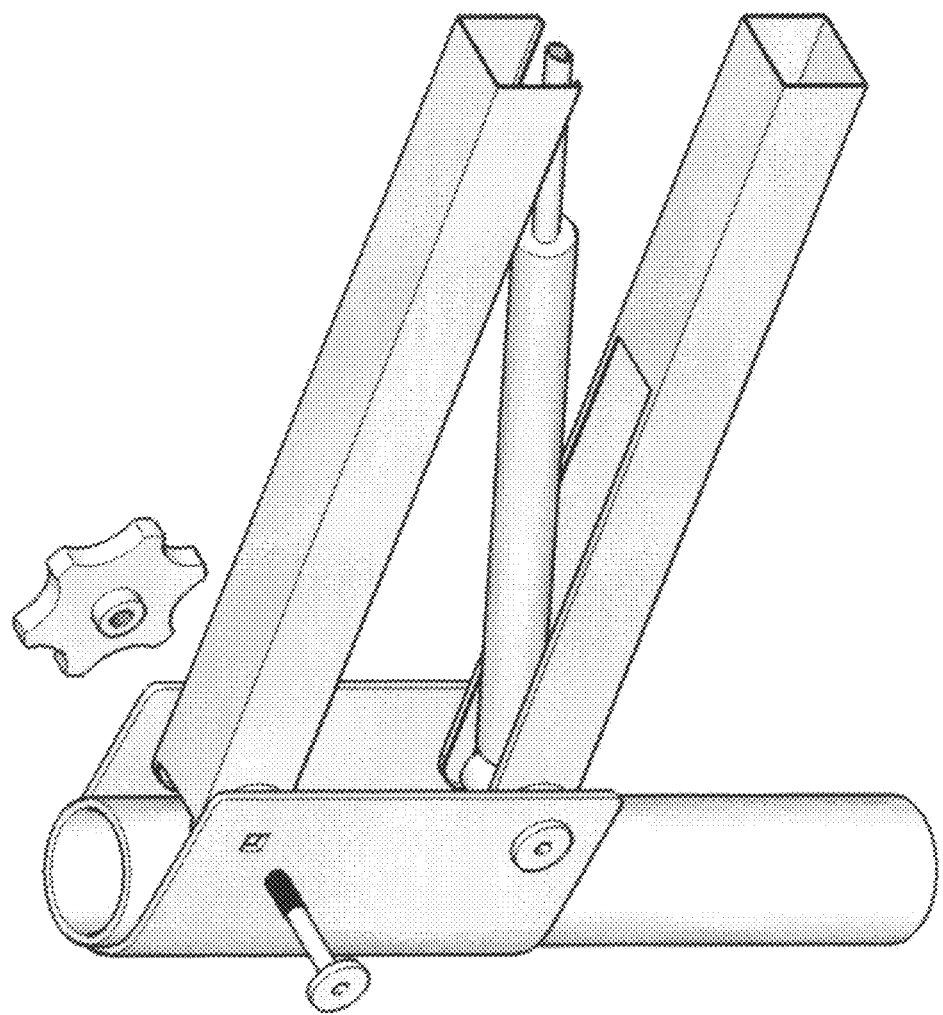
FIG. 17 is an exploded view of the top part of the bracket showing the round handle with locking shaft.

As indicated in FIG. 17 and Reference 1, a round threaded handle with locking shaft is used to reduce or lock the movement of the said piston and articulated arm assembly by pressing the said bracket and arms together. The handle is a metal or plastic wheel with a threaded hole. The shaft is a metal cylinder, smooth on the outer surface, threaded at one extremity with a locking head at the other. The shaft is positioned through the said arms and bracket holes and fastens to the threaded handle. The smooth surface of the shaft provides a low-friction rotating motion along the inner surface of the assembly when the handle is loosened. Friction between the bracket and the arm is increased as the handle is tightened.

Figure 18:
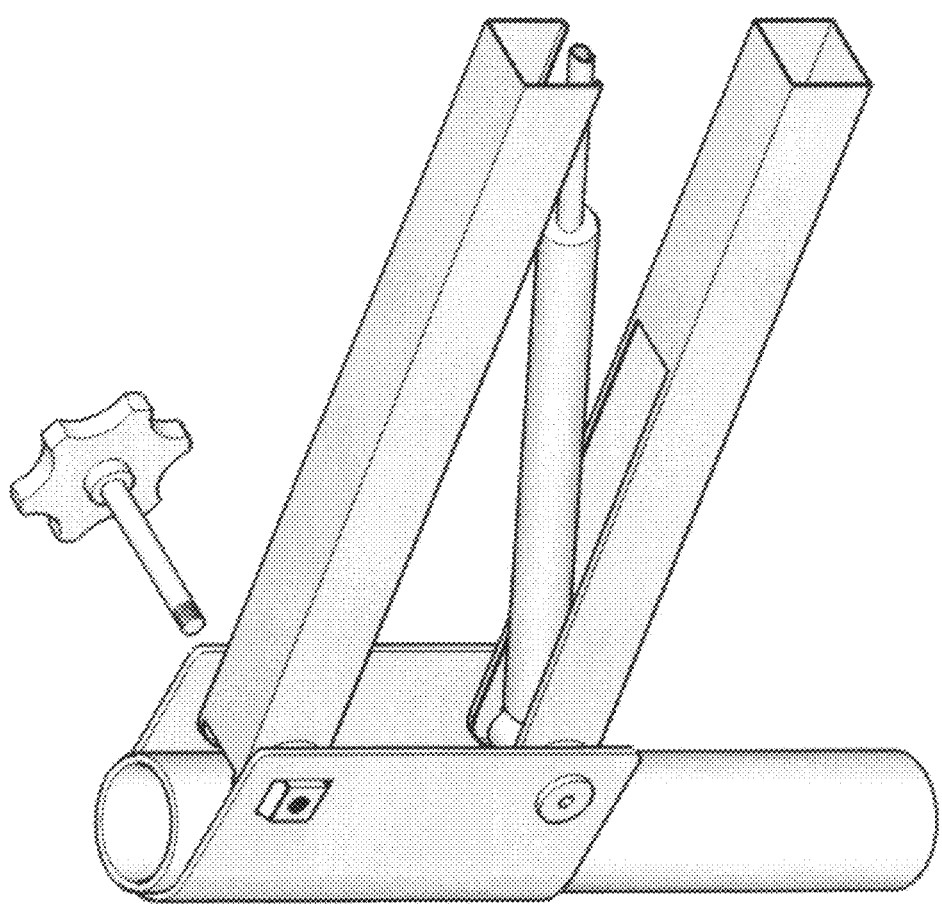
FIG. 18 is an exploded view of the top part of the bracket showing the round handle with welded nut.

As indicated in FIG. 18 and Reference 2, a round handle with threaded shaft is used with a matching nut welded to the said bracket rather than the said round handle with locking shaft force increased force and stability.

Figure 19A:
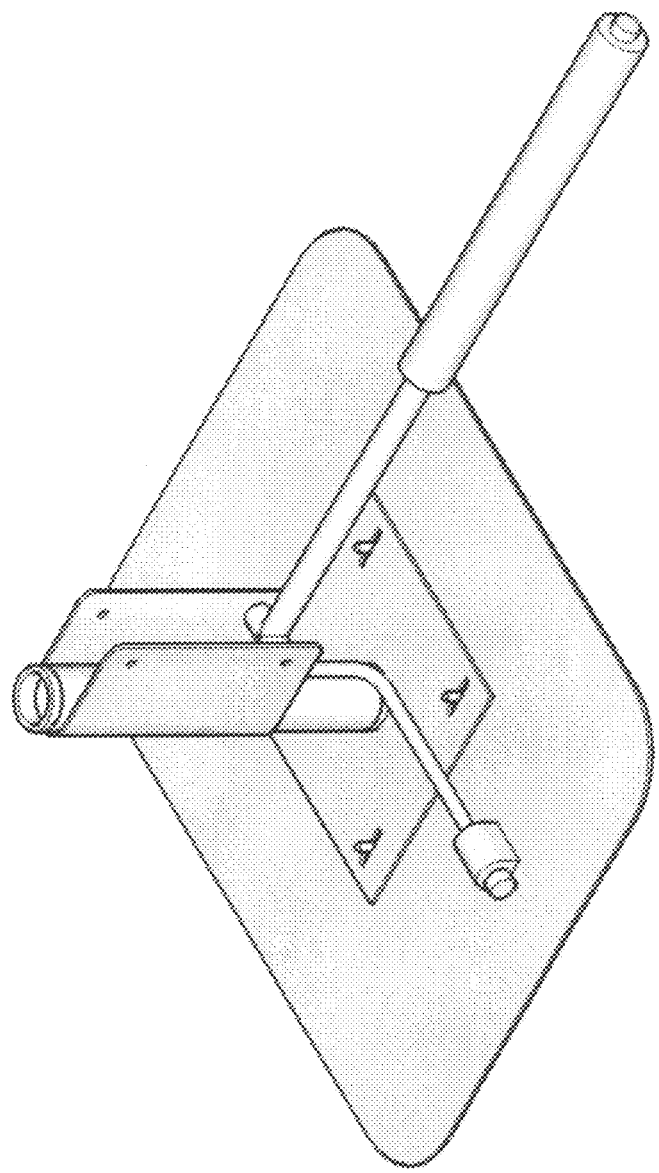
FIG. 19A is a projection underside view of the bracket and tray assembly showing the pressure lockable piston, push-button and flexible extension tube.
Figure 19B:
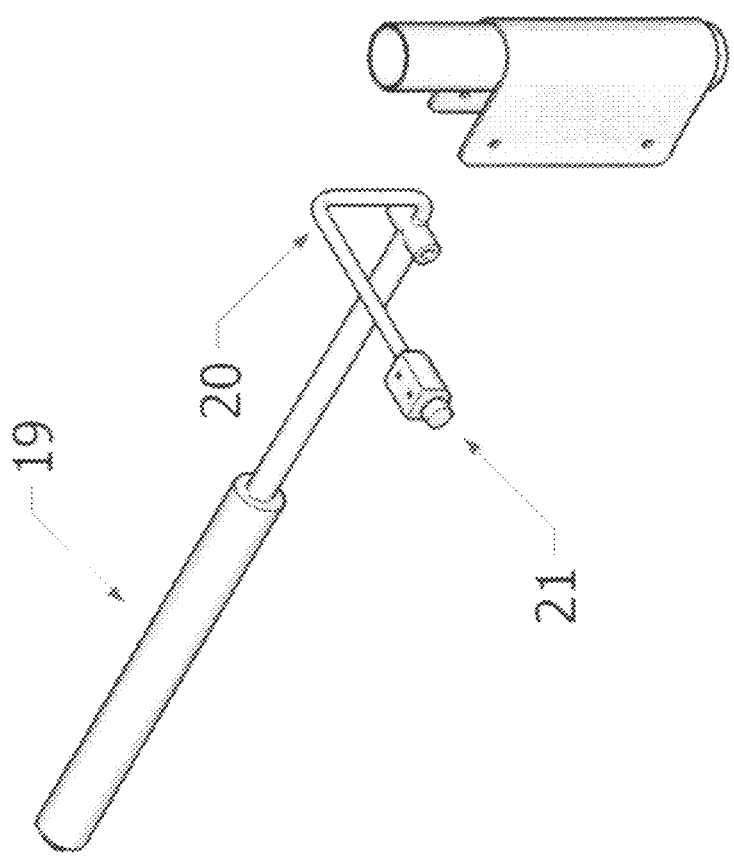
FIG. 19B is an exploded topside view of the same assembly.

Referring to FIG. 19A and FIG. 19B, a pressure lockable piston (19) with flexible extension pipe (20) and push button assembly (21) may be used to reduce or lock the movement of the said piston. The pressure lockable piston differs from the regular said piston in that a hydraulic-activated locking feature is available at the end of the piston rod. The piston motion is locked when the button at the end of the piston rod is released, or in the case shown in the figure, the button at the end of the flexible extension pipe. The piston rod end is equipped with a metal cylinder with a threaded inner hole at each end. Two shoulder screws may be used to fasten the rod end cylinder to the bracket in the holes shown in the figure. The thread length of the shoulder screw, the shoulder height and the thread depth of the cylinder holes are chosen such that a gap will form between the bracket wall and the cylinder end allowing the cylinder and shoulder screw together to rotate in the bracket hole. Flexible washers may also be used between the cylinder and the bracket inside wall to provide additional tension to the said articulating arm assembly when the piston is not in the locking state. The push button assembly is mounted on the underside of the said tray to provide easy access. The extension pipe is flexible enough to bend in the directions shown but stiff enough that in does not require fasteners to keep it from sagging. The articulating arm assembly is thus locked when the button is released and moveable when the button is pressed.

Bracket Post

Figure 24:
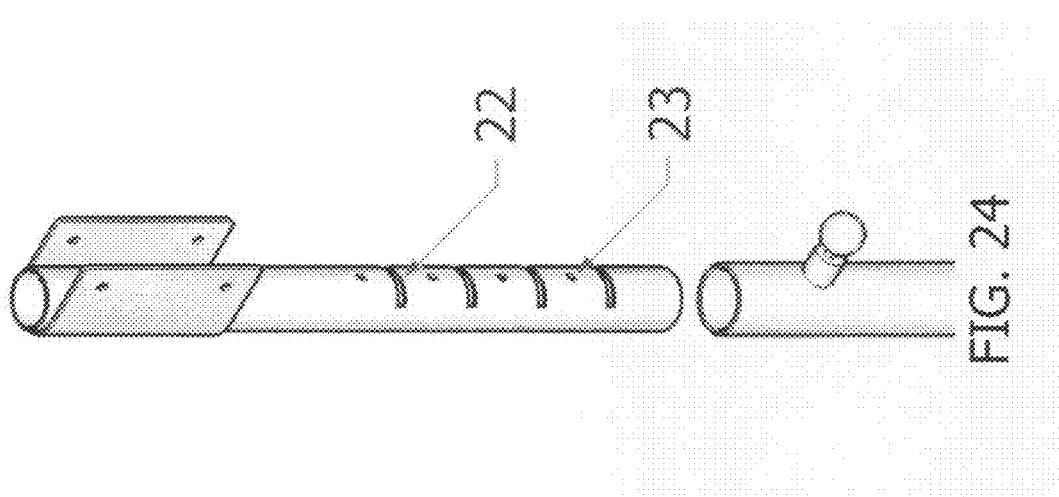
FIG. 24 is an enlarged view of the lower bracket post and the base post showing the array of slots, array of holes and spring plunger lock.

As indicated in FIG. 20A, FIG. 20B and Reference 1, the said bracket posts are a rigid, hollow circular tube of metal with two pairs of holes facing each other at one extremity for fastening to the said bracket. As shown in FIG. 24, the said lower bracket post may include an array of slots (22) at the other extremity that provide a height adjustment of the said arm assembly with respect to the said base assembly. The slots are grooved high enough to accommodate a pin inserted through the base assembly post. The slots are grooved wide enough to allow a rotating motion of the arm assembly with respect to the base assembly.

As indicated in FIG. 24 and Reference 2, the said lower bracket post may include an array of holes (23) in addition to the said array of slots that accommodate a height adjustment of the said arm assembly with respect to the said base assembly as well as a rotation locking function.

Figure 25A:
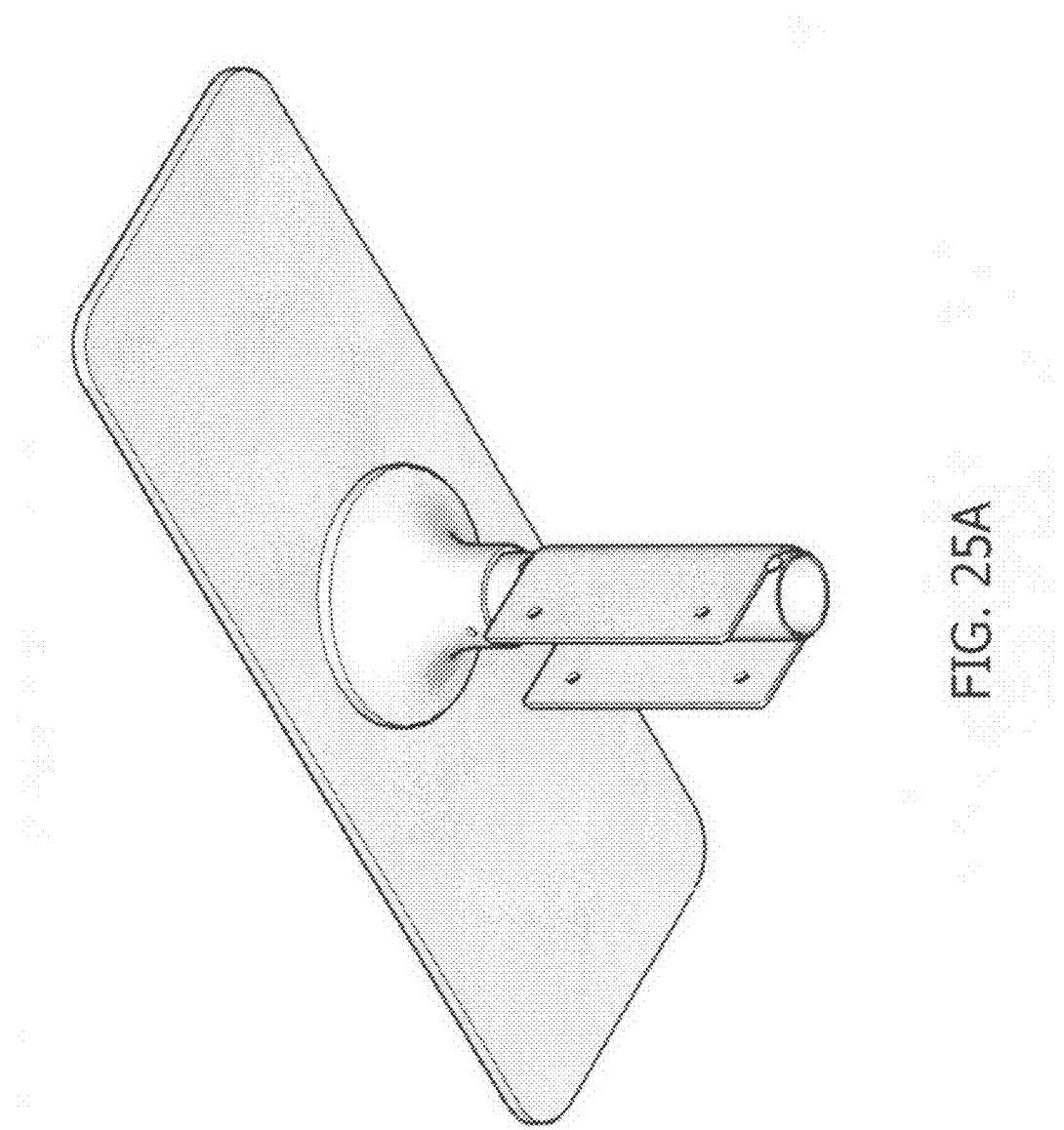
FIG. 25A is an underside projection view of the upper bracket, upper bracket post, tray flange and tray.

As indicated in FIG. 25A, FIG. 25B and Reference 2, the outer round surface of the said bracket post provides a rotation motion of the said tray assembly with respect to the said arm assembly. The bracket post may include a U-shaped groove near one extremity that runs in a circular manner around the entire circumference of the post.

As indicated in Reference 2, the said bracket posts may also be constructed of square or rectangular, plastic or metal tubing as well as solid wood.

Figure 26A:
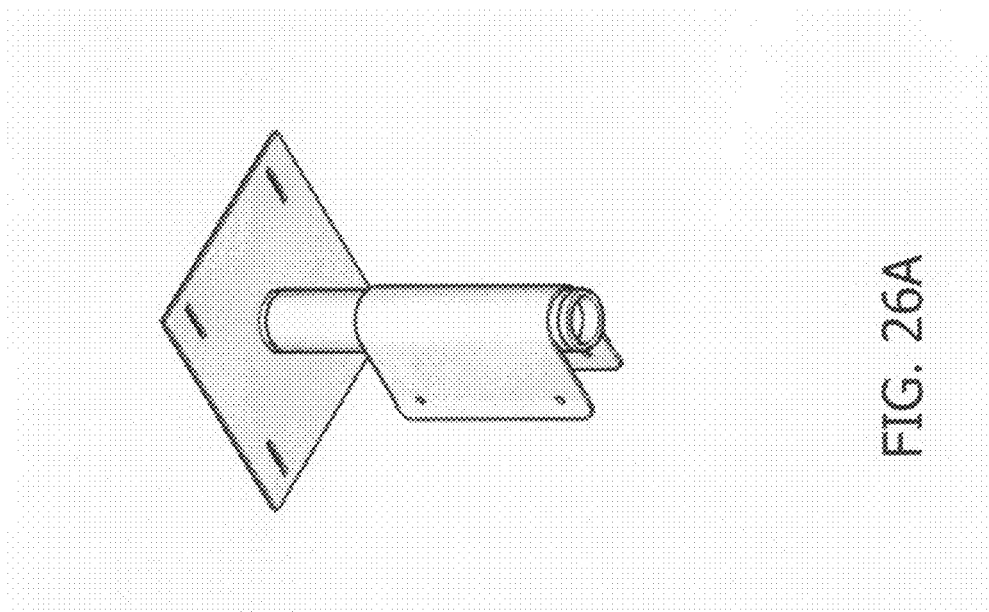
FIG. 26A is an underside projection view of the upper bracket, upper bracket post, bearings and tray post.

Referring to FIG. 26A and FIG. 26B, the inner round surface of the said bracket post provides a rotation motion for the said tray assembly with respect to the said arm assembly.

A flanged bearing (24) may be used between the bracket post and the tray post. The flanged bearing is a plastic or metal, round, flanged tube that provides load bearing between the inner cylindrical surface of the bracket post and the outer cylindrical surface of the tray post. A second bearing, flanged or straight, may be used at the bottom end of the bracket post to provide a better vertical stability of the tray assembly.

Tray Flange

As indicated in FIG. 25A, FIG. 25B and Reference 2, a tray flange may be used to fasten the said top tray to the said bracket post. The inner diameter of the tray flange is sized to fit the bracket post outer diameter in a manner tight enough to allow a rotating motion with low friction when assembled to the bracket post. The flange is equipped with a threaded hole near its collar extremity. A set screw may be used in the flange hole and sized to match the said bracket post groove allowing the flange to rotate freely on the post but preventing it from being removed from the post. The flange is equipped with four threaded holes on its top, round flat surface to allow fastening to the said top tray frame. The tray flange is constructed of a metal material but may also be constructed of a plastic or wooden material.

Tray Assembly

Figure 27A:
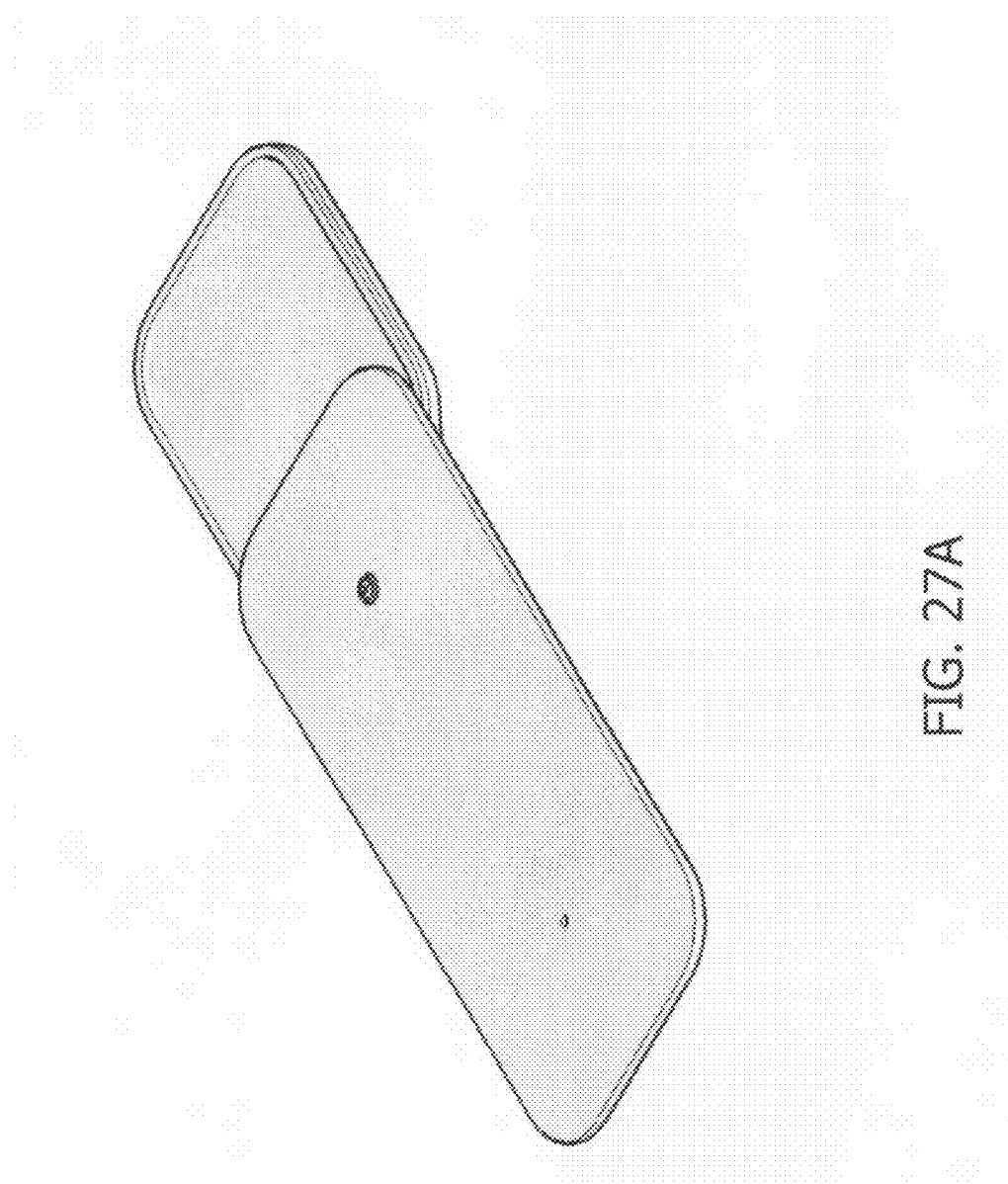
FIG. 27A is a parallel projection view of the top tray, side tray, shoulder screw, barrel nut and washers.

As indicated in FIG. 27A, FIG. 27B and Reference 1, a top tray (25) and side tray (26) may be used to construct the said tray assembly. A binding post (27), barrel nut (28) and washers are used through the said top tray and said side tray to fasten the trays together providing a rotating motion of the side tray with respect to the top tray. The underside of the top tray and the top side of the side tray are flat and smooth around the holes allowing a tight fit with some friction to the rotating movement. The binding post and barrel nut may be tightened together with locking fluid to prevent loosening after a prolonged swiveling motion of the two trays.

As indicated in Reference 1, in a preferred embodiment, the top tray may be of dimensions suitable for supporting a regular computer keyboard and the side tray may be of dimensions suitable for supporting a regular computer mouse.

Referring to FIG. 27A and FIG. 27B, two larger washers (29) may be used between the top tray and the side tray to provide a more durable high-friction contact. A shoulder screw may also be used rather than the said binding post screw. The shoulder screw and barrel nut together provide a better, more constant and controlled fastening pressure with a fixed mating length.

Referring to FIG. 27A and FIG. 27B, the said top tray and side tray may be constructed of a molded plastic material and may include features such as the tapered underside and the topside contour rim. The tapered underside allows for an added layer of material and thus improved rigidity and stiffness and the rim is used to prevent rolling items from falling off the tray.

Figure 28A:
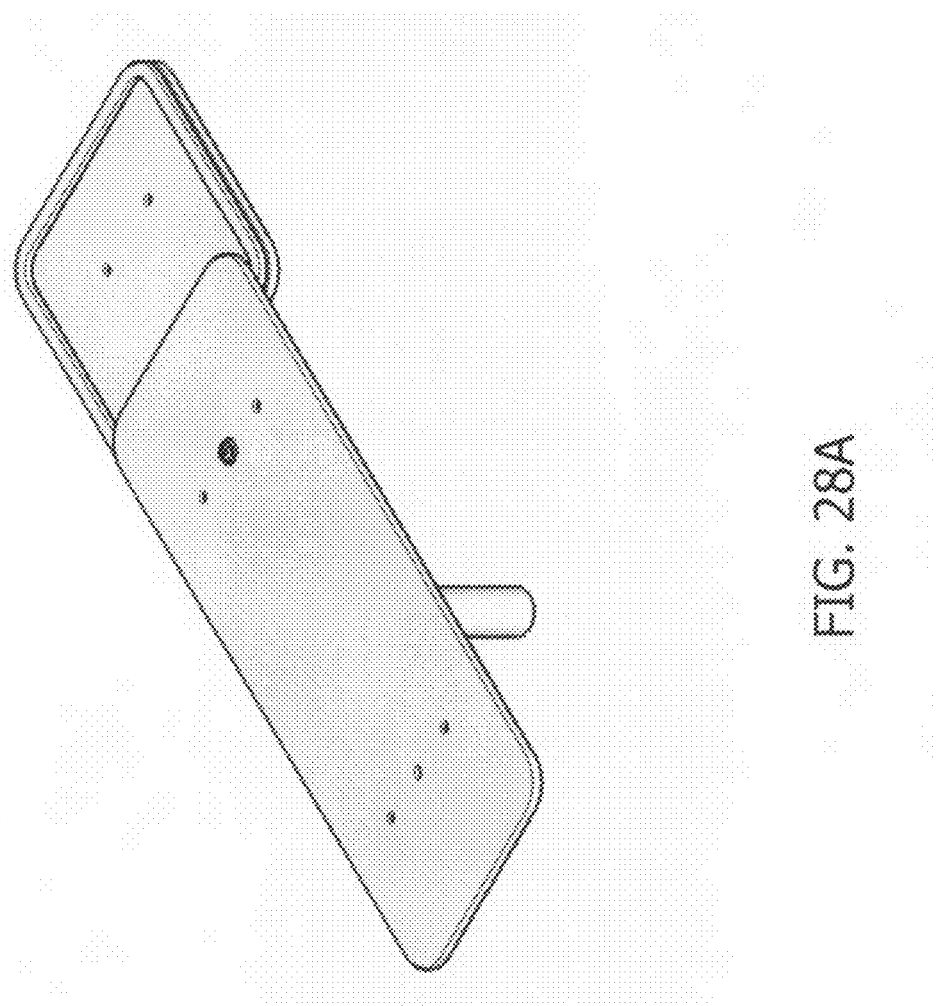
FIG. 28A is a parallel projection view of the top tray, top tray frame, side tray, side tray frame, side tray contour pad, shoulder screw, barrel nut and washers.
Figure 28B:
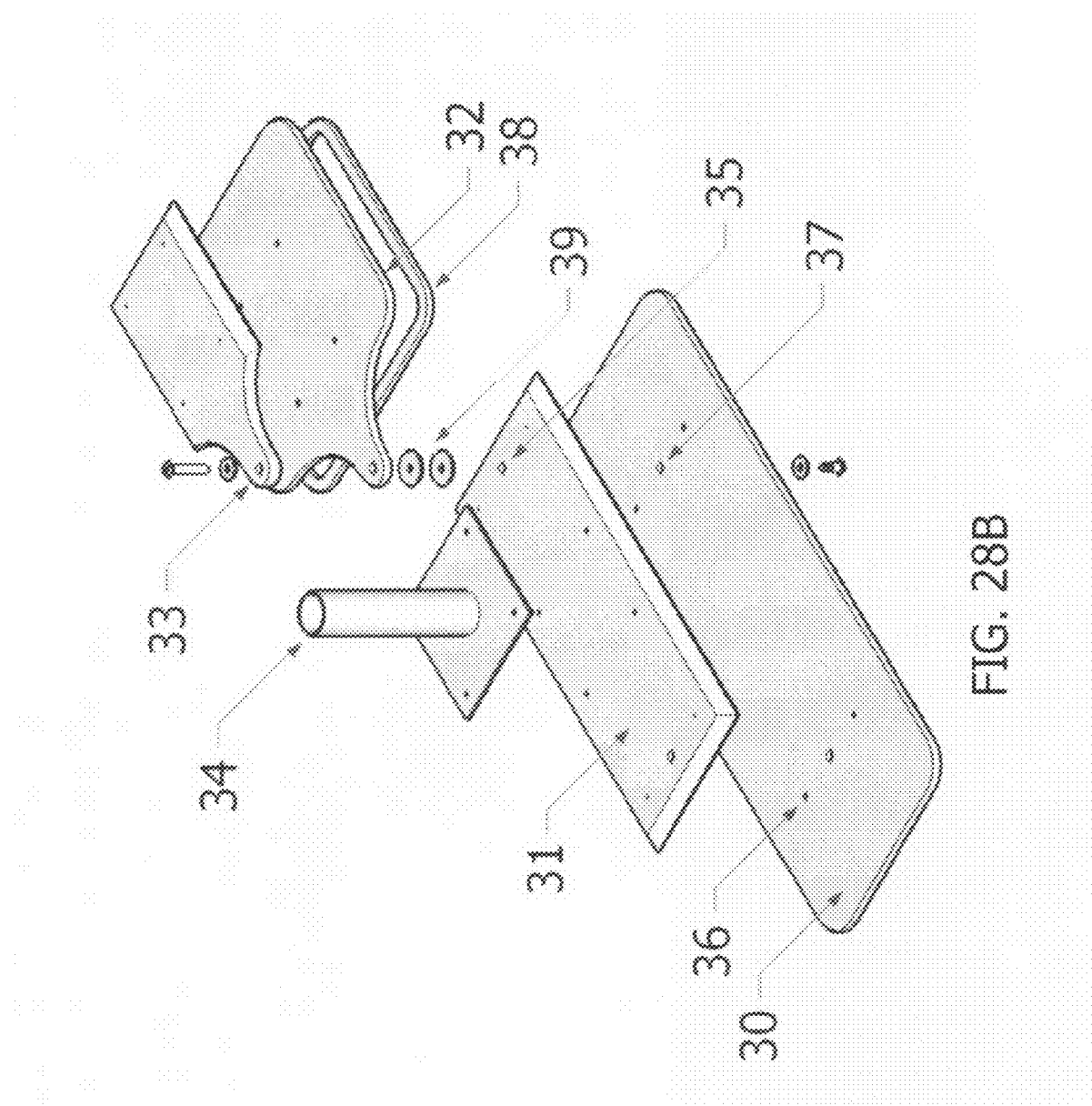
FIG. 28B is an exploded underside view of the same assembly.

As indicated in FIG. 28A, FIG. 28B and Reference 2, a top tray (30), top tray frame (31), side tray (32) and side tray frame (33) may be used to construct the said tray assembly. The said top tray frame is a very rigid, wooden or plastic rectangular board with four holes that accommodate fastening to the tray post with plate (34). Four V-neck bolts and four nuts are used to fasten the top tray frame to the post plate. The top tray frame holes are counter-sunk such that the V-neck bolts are entirely recessed into the frame. The frame is also equipped with a hole (35) as a mounting point for the said side tray.

As indicated in FIG. 28A, FIG. 28B and Reference 2, the said top tray is a thin, wooden or plastic rectangular flat board. Four holes (36) are used to fasten the tray to the said top tray frame. The top tray is also equipped with a hole (37) as a mounting point for the said side tray.

As indicated in FIG. 28A, FIG. 28B and Reference 2, the said side tray frame is a very rigid, wooden or plastic rectangular flat board with a narrow, rounded extension on one of its shorter side. The frame is equipped with a hole positioned at the extremity of the board extension such that is can be used as a swiveling mounting point to the said top tray.

As indicated in FIG. 28A, FIG. 28B and Reference 2, the said side tray is a thin, wooden or plastic rectangular flat board with a narrow, rounded extension on one of its shorter side. Four screws are used to fasten the side tray to the said side tray frame through the four holes shown.

As indicated in FIG. 28A, FIG. 28B and Reference 2, the said side tray contour rim (38) is used to prevent rolling items from falling off the tray. The rim is fabricated from foam or plastic material and is dimensioned to match the usable portion of the said side tray. The underside of the pad may be covered with an adhesive that is used to fasten it to the tray.

Two large washers (39) may be used between the top tray frame and the side tray frame to provide a durable high-friction surface contact.

Figure 29A:
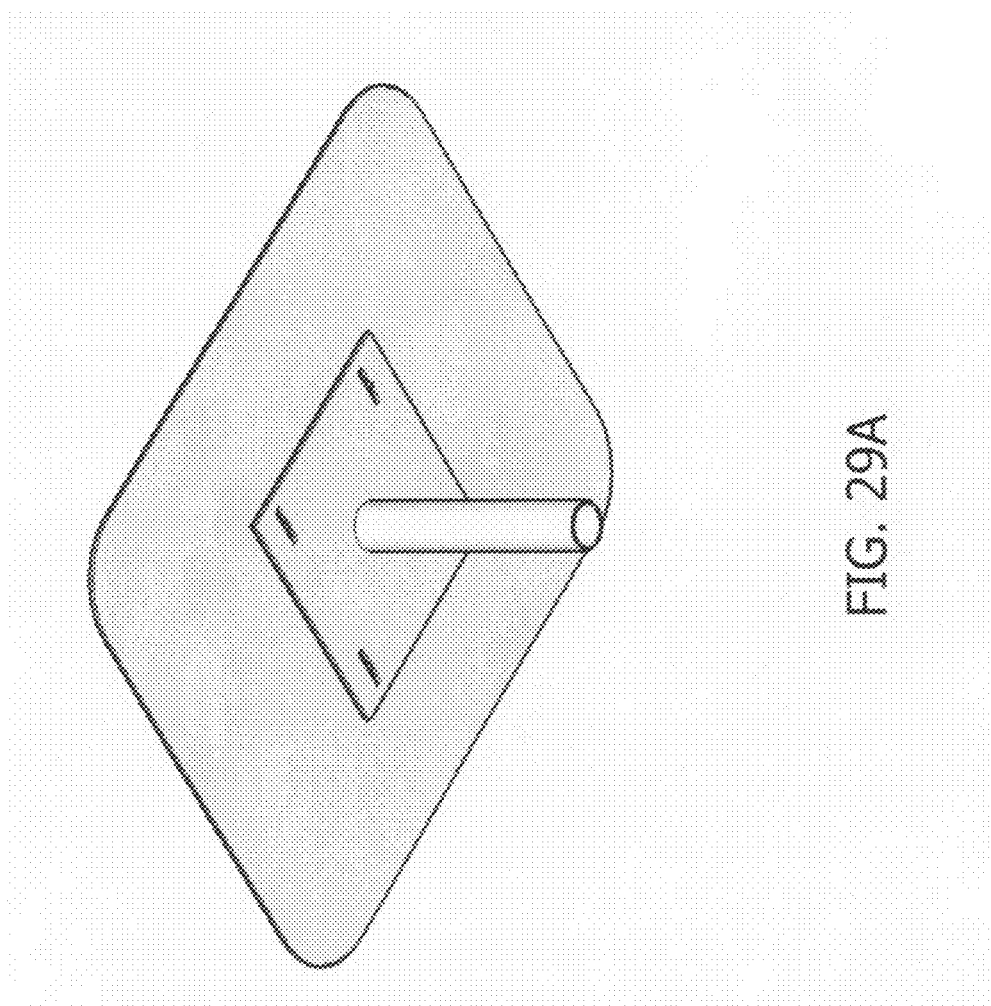
FIG. 29A is a parallel projection underside view of the tray post with plate and the top tray.
Figure 29B:
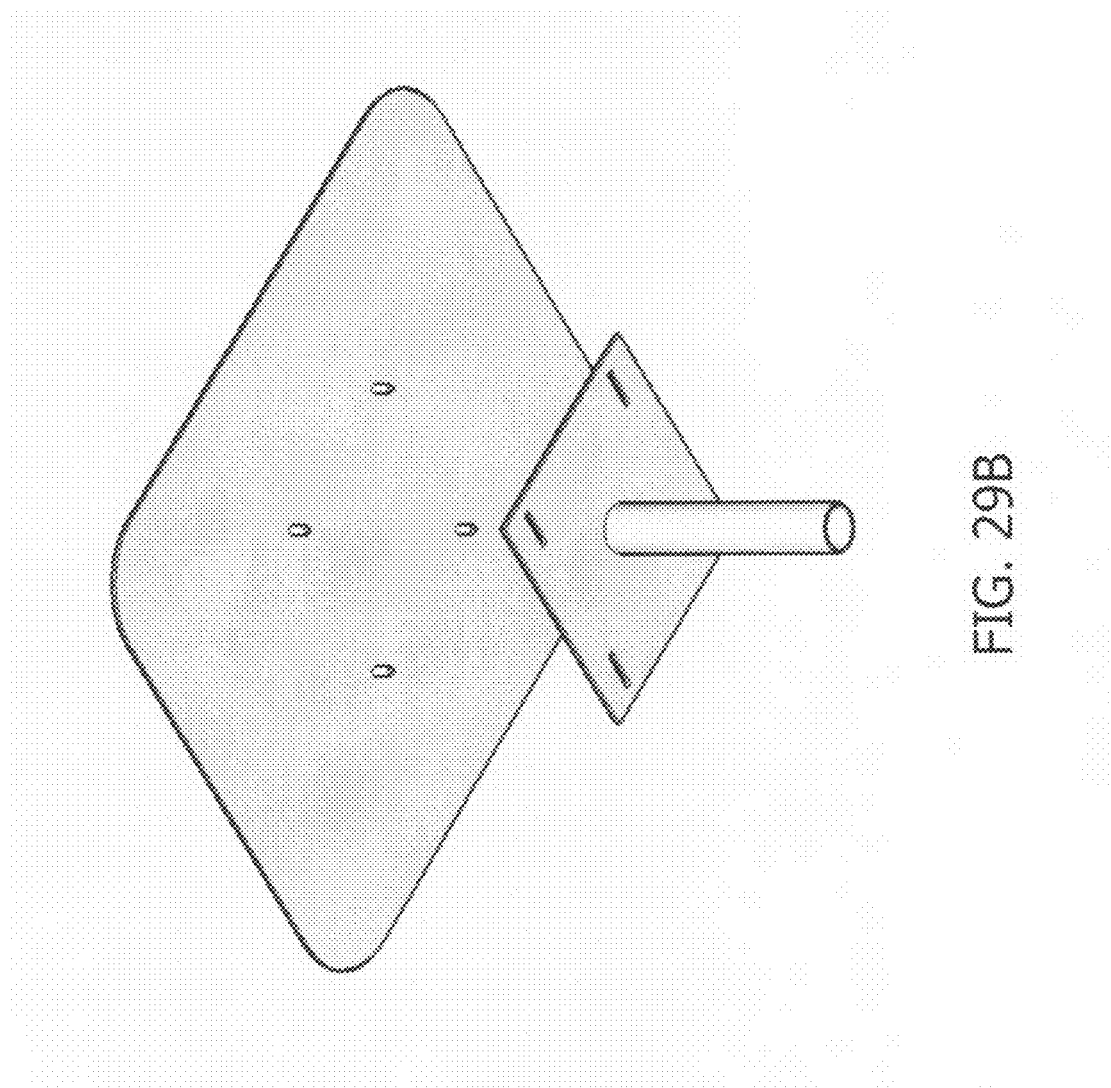
FIG. 29B is an exploded view of the same assembly.

Referring to FIG. 29A and FIG. 29B, a tray post with plate and a top tray may be used to construct the said tray assembly.

The said tray post with plate is a metal tube welded to a metal plate, or a metal plate with a hole and metal tube welded and/or press-fitted, or a plastic one-piece molded assembly. The tray post plate includes holes and/or slots to accommodate fastening of the said top tray.

The said top tray is a sheet of metal with welded or press-fitted threaded studs, or a single-piece molded plastic board with threaded studs or a plastic board with press-fitted plastic or metal threaded studs. The studs are used to fasten the top tray to the said tray post plate with nuts.

Referring to FIG. 30A and FIG. 30B, a side tray with tube (40) may be used in addition to the said top tray. One or two side tray bearings (41) may also be used in the tray assembly to provide increased stability.

The said side tray with tube is a metal plate with a hole and a metal round tube welded over the hole, or welded and/or press-fitted through the hole or a plastic one-piece molded assembly.

The said side tray bearing is a plastic or metal round flanged tube that provides load bearing between the inner cylindrical surface of the said side tray tube and the outer cylindrical surface of the said bracket post. One bearing may be used at each extremity of the side tray tube.

Base Assembly

As indicated in Reference 1, the said base assembly consists of a base unit and a post. The parts comprising the base assembly must be fastened together adequately to provide a very rigid horizontal and vertical structure necessary to support the moment of force exerted by the said arm assembly and the combined weight of the assembly with the items that are placed on the tray(s).

Figure 1:
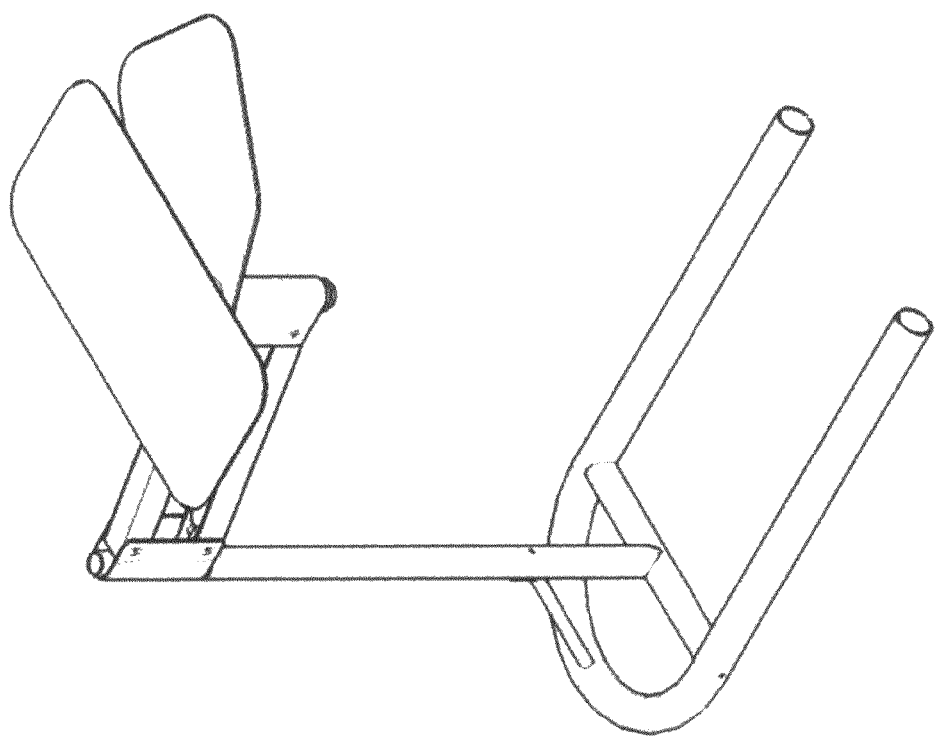
FIG. 1 is a parallel projection view of the stand assembly constructed with a U-shaped tube base assembly and dual trays for computer keyboard and mouse.
Figure 2:
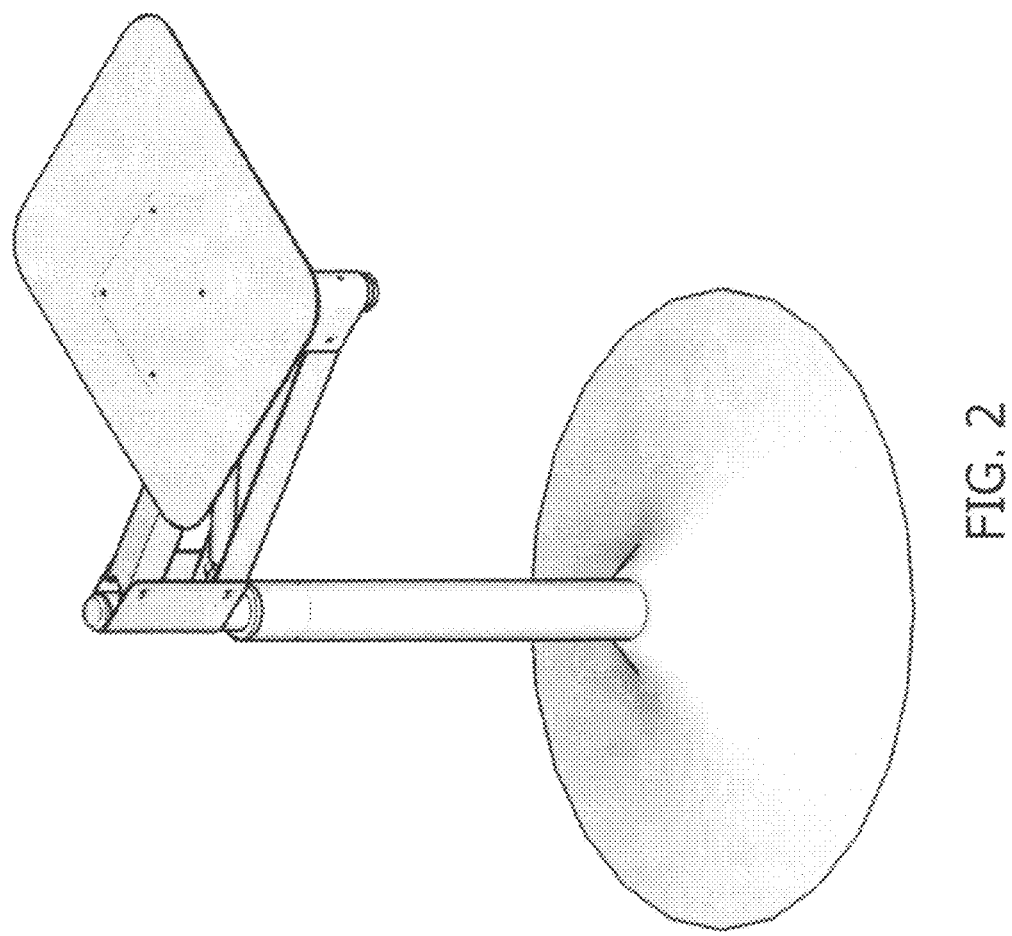
FIG. 2 is a parallel projection view of the stand assembly constructed with a conical disk base assembly and a single tray.
Figure 3:
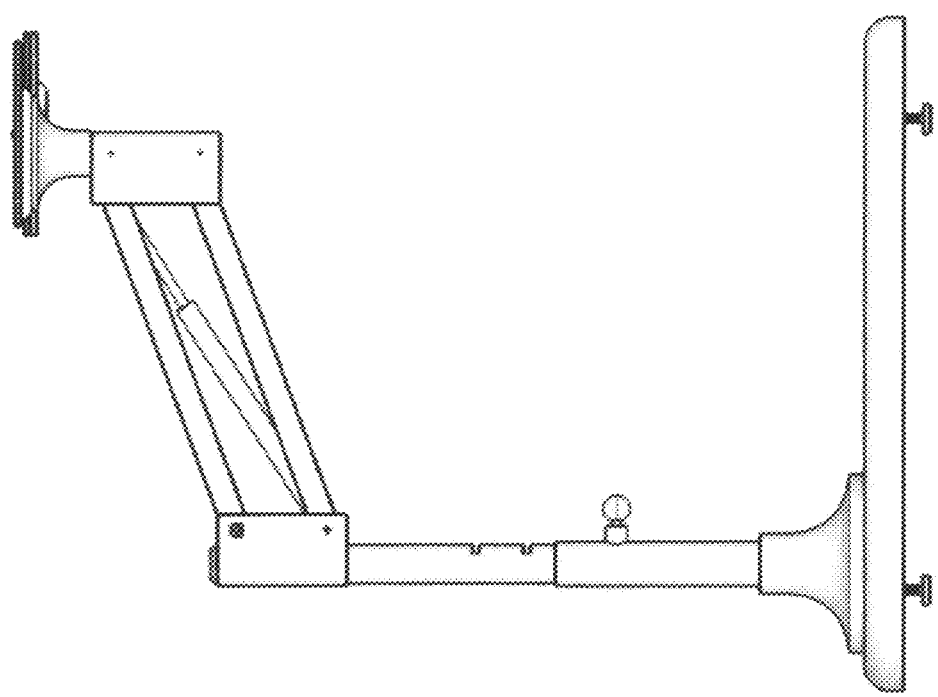
FIG. 3 is a left side view of the stand assembly.
Figure 4:
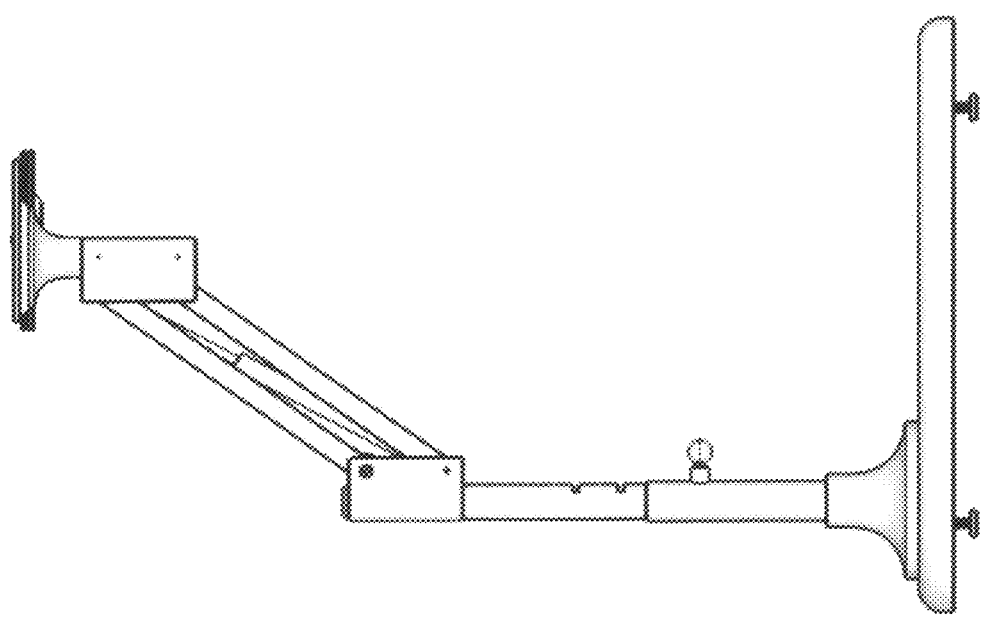
FIG. 4 is a left side view of the stand assembly with its tray assembly raised to its maximum height position demonstrating the upward arm assembly articulation.
Figure 5:
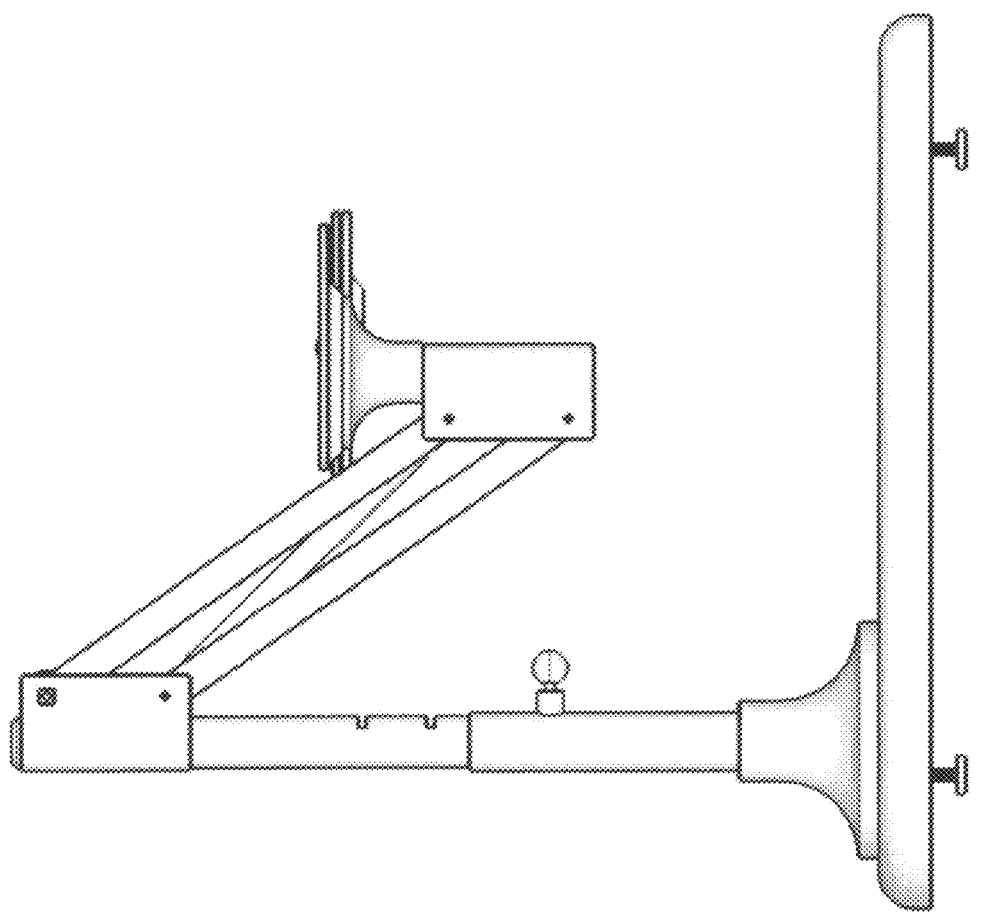
FIG. 5 is a left side view of the stand assembly with its tray assembly lowered to its minimum height position demonstrating the downward arm assembly articulation.
Figure 6:
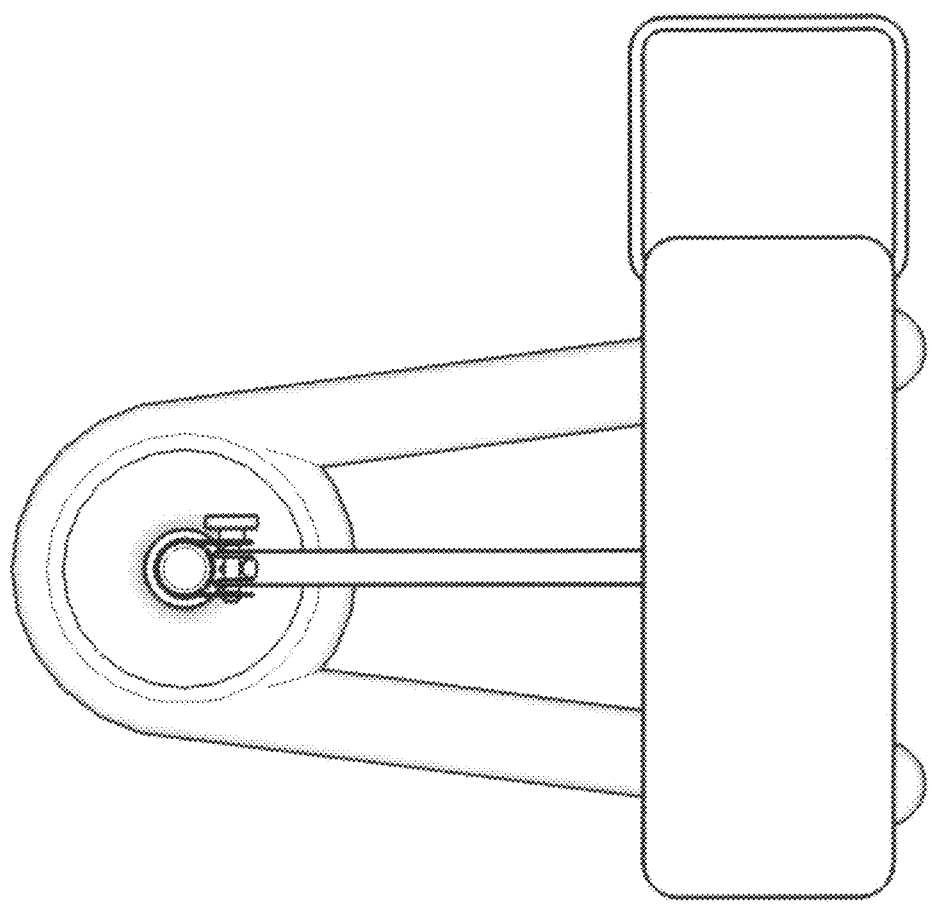
FIG. 6 is a top view of the stand assembly.
Figure 7:
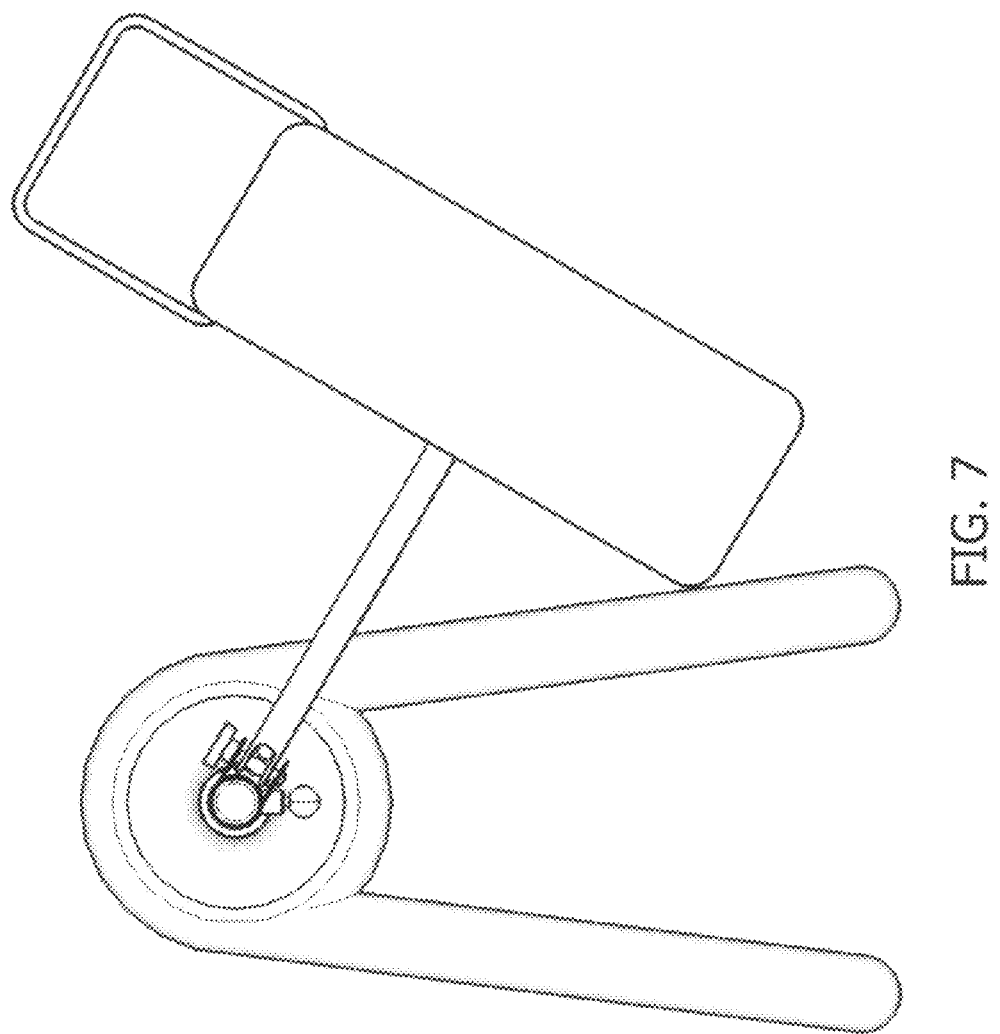
FIG. 7 is a top view of the stand assembly with its tray assembly moved to its maximum right hand side position demonstrating the arm assembly rotation with respect to the base assembly.
Figure 8:
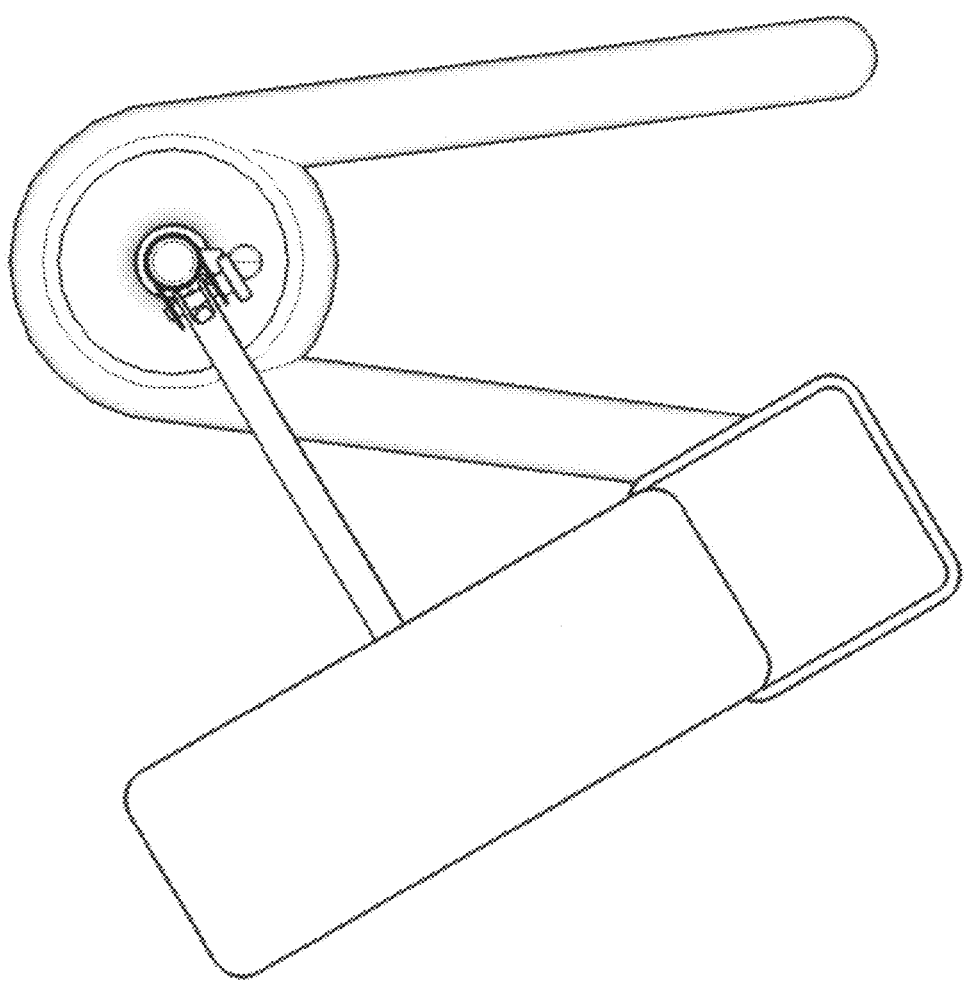
FIG. 8 is a top view of the stand assembly with its tray assembly moved to its maximum left hand side position demonstrating the arm assembly rotation with respect to the base assembly.
Figure 9:
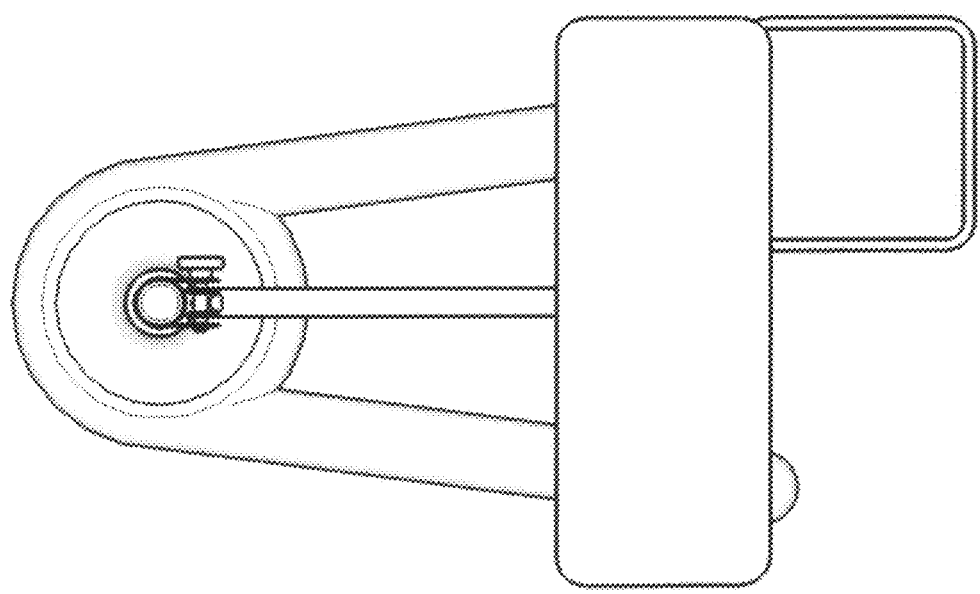
FIG. 9 is a top view of the stand assembly with its side tray rotated into an inward position demonstrating the side tray to top tray rotation.
Figure 10:
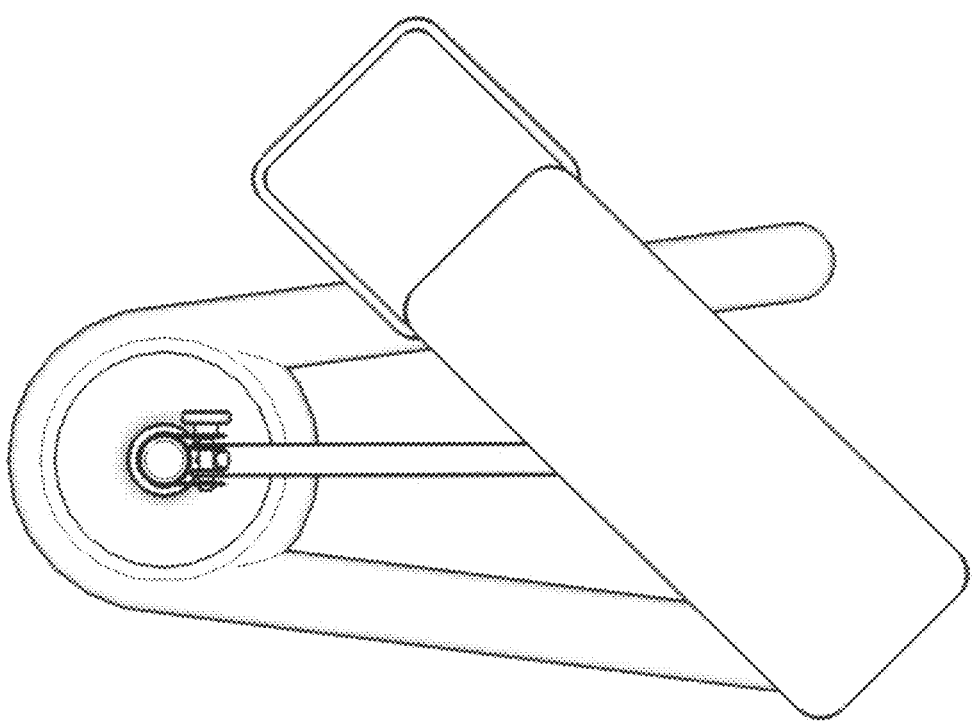
FIG. 10 is a top view of the stand assembly with its tray assembly rotated to its maximum counterclockwise position demonstrating the tray assembly rotation with respect to the arm assembly.
Figure 11:
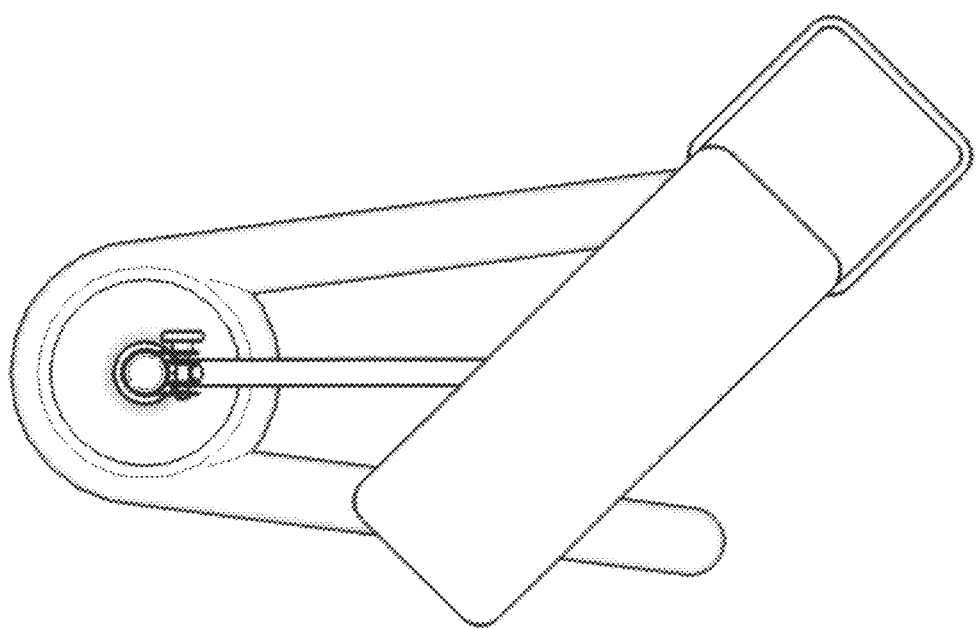
FIG. 11 is a top view of the stand assembly with its tray assembly rotated to its maximum clockwise position demonstrating the tray assembly rotation with respect to the arm assembly.

As indicated in FIG. 1 and Reference 1, a U-shaped base assembly may be used to construct the stand assembly. The base unit shape may be a round U-shape, square U-shape or V-shape piece with arms rigid and sufficiently thin to fit under a sofa or recliner chair as the stand is used from a seated position.

U-Shaped Tube Base Unit

Referring to FIG. 31A and FIG. 31B, a U-shaped tube, a T-shaped tube and a diagonal tube brace may be used to construct the said base unit and base post combined. These three tubular parts are round, rectangular or square tubes and are constructed from metal or plastic. They are equipped with through holes (42) and threaded holes (43) such that they are assembled together with four bolts. The T-shaped tube is a molded single-piece of plastic material or a combination of two pieces of metal tubes welded together or fastened with a bolt into a threaded end hole.

O-Shaped Tube Base Unit

Figure 32A:
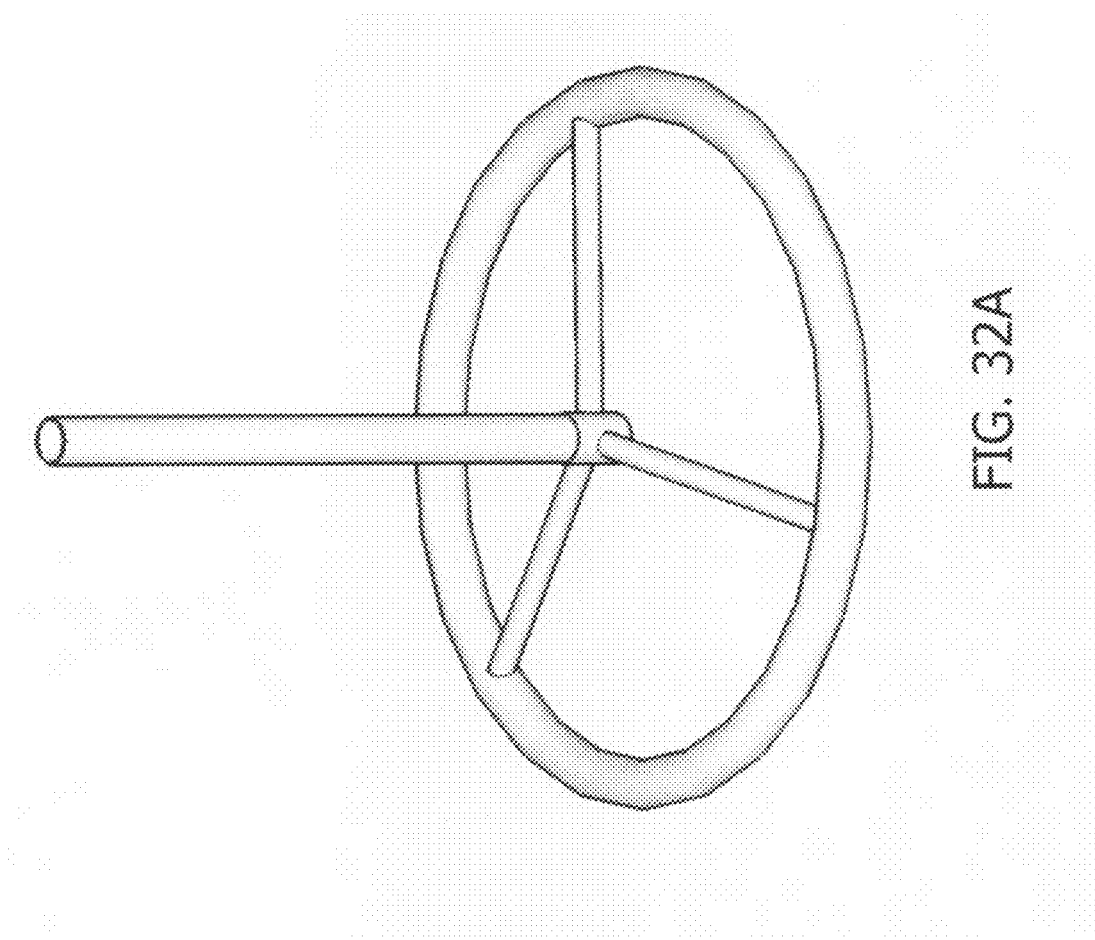
FIG. 32A is a parallel projection view of the O-shaped tube base assembly.

Referring to FIG. 32A and FIG. 32B, an O-shaped tube, three spoke tubes (44), a middle pipe (45), a post (46), a bolt and a washer (47) may be used to construct the said base unit and base post combined. These parts are constructed from metal or plastic round tube. The O-shaped tube and the spoke tubes may be constructed of square or rectangular tube rather than round. In the case of metal, the O-shaped tube, the spoke tubes and the middle pipe are welded together to form one base unit part. In the case of plastic, the joining points between the O-shaped tube, the spoke tubes and the middle pipe are shaped and styled such that the parts are fitted and snapped together securely to form the base unit. As shown in FIG. 33, the middle pipe and the post end are cylinders with a very slight tapered shape such that the post can be manually wedged tightly into the pipe. The tapered end of the post is equipped with a ring with threaded hole on its flat, round end and the bolt is used with the slightly convex washer to fasten the base unit and the post together. In FIG. 33, the middle pipe is represented by the tapered outer cylinder (48). The pipe and the post may also be straight cylinders that are held together by a screw through a threaded hole through the pipe wall into a hole in the post wall.

Conical Disk Base Unit

Figure 34A:
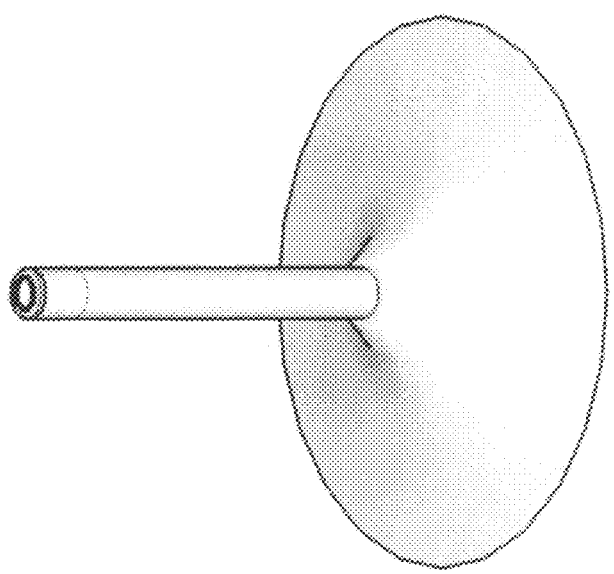
FIG. 34A is a parallel projection view of the conical disk base assembly.
Figure 34B:
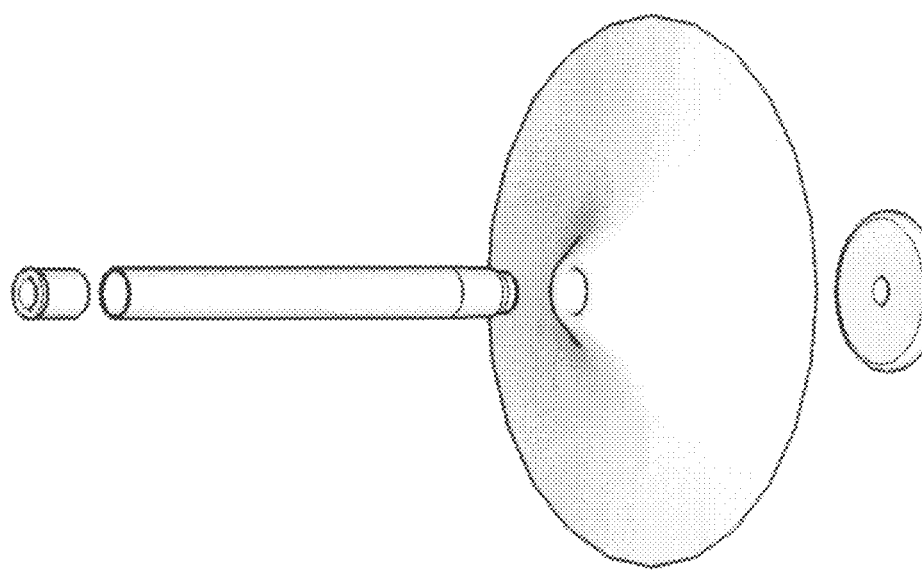
FIG. 34B is an exploded view of the same assembly.

Referring to FIG. 34A and FIG. 34B, a conical disk, a post, a bolt and a washer may also be used to construct the said base unit and base post combined. The disk is a piece of sheet metal that is spun (attached to a lathe, turned at reasonably high speed and shaped with a controlled, hard, sharp, moving edge) into a very flat cone with a collar that folds inwards into the middle hole. The outer edge is also folded inwards slightly to produce a short, flat surface around the perimeter in order for the disk underside to rest parallel to the floor. As shown in FIG. 33, the inner collar of the base disk and the end of the post are cylinders with a very slight tapered shape such that the post can be manually wedged tightly into the disk. The tapered end of the post is equipped with a ring with threaded hole on the flat, round end of the post and the disk bolt is used with the disk washer to fasten the post and the disk together. In FIG. 33, the base unit is represented by the tapered outer cylinder (48). A round weight with a center hole, shown at the bottom of the figure may be used inside the disk between the washer and the disk to provide a counterweight for the stand assembly. The weight is a cast iron disk or a sand-filled plastic enclosure that may be shaped to match the underside of the disk. The disk bolt may be an L-shaped bolt that can be manually inserted and tightened without the need for a tool.

Base Flange and Post

Figure 35A:
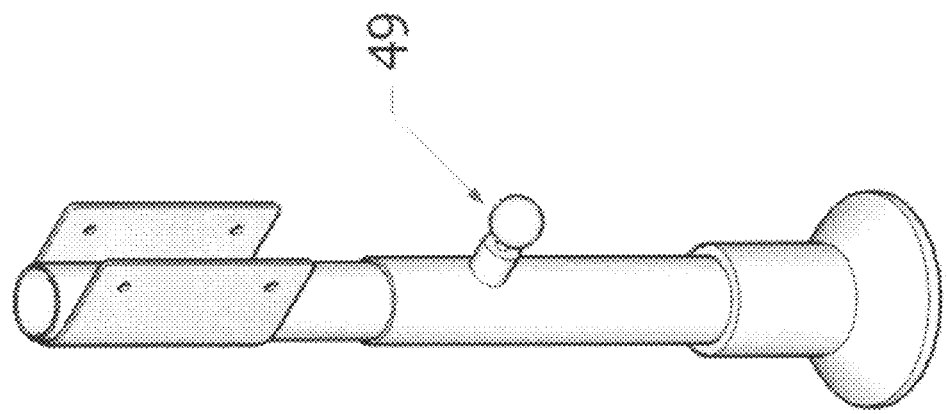
FIG. 35A is a parallel projection view of the flange with post base assembly.
Figure 35B:
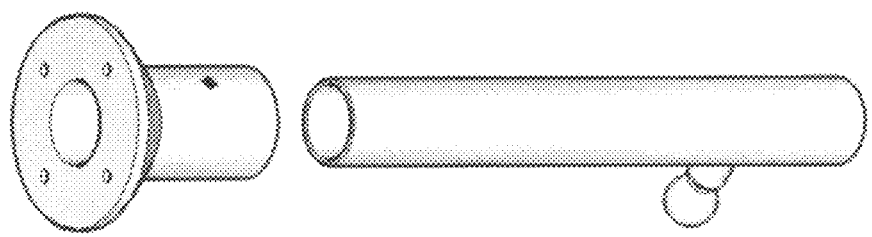
FIG. 35B is an exploded underside view of the same assembly.

As indicated in FIG. 35A, FIG. 35B and Reference 1, a base flange and post may be used to construct the said stand assembly. The base flange is a round tube or collar with a flat mounting surface. Its inner diameter is sized to fit the said base post outer diameter in a manner tight enough to prevent motion when assembled to the post. The flange is drilled with four threaded holes on its underside surface to accommodate fastening to a base unit from the underside. The post flange may be equipped with a threaded hole near its narrow extremity. A set screw may be used in the flange hole to lock the flange to the post. The post flange is constructed of a metal material but may also be constructed of a plastic or wooden material, sufficiently rigid to prevent bending of the said base post with respect to the base unit.

Referring to FIG. 35A and FIG. 35B, the said mounting holes may be drilled through the entire part rather than only partially on the underside to also allow fastening from the top.

Referring to FIG. 35A and FIG. 35B, the said flange and post may be used to fasten the stand assembly directly to the floor rather than another assembly.

As indicated in FIG. 35A, FIG. 35B and Reference 1, the said base post is constructed of round metal tubing and is drilled with one hole at one extremity and equipped with the said post lock spring plunger (49) positioned over the hole. The hole size is chosen to match the plunger pin. The plunger cylinder may be welded to the outer surface of the post. The base post and the said bracket post are sized and finished such that they can be fitted together telescopically without friction. The outer post may also be constructed of square or rectangular, plastic or metal tubing.

Single-Piece Base Unit

Figure 36A:
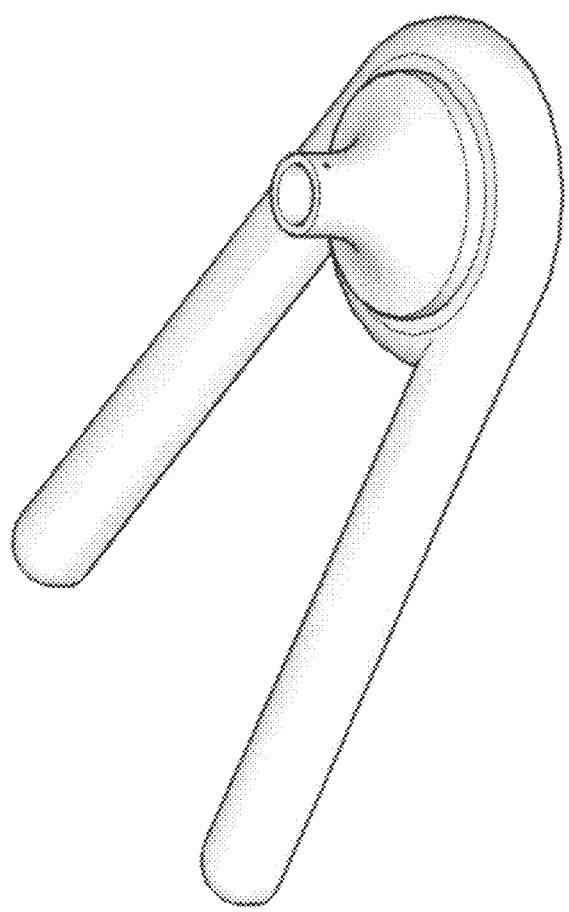
FIG. 36A is a parallel projection view of the single-piece base unit with flange.
Figure 36B:
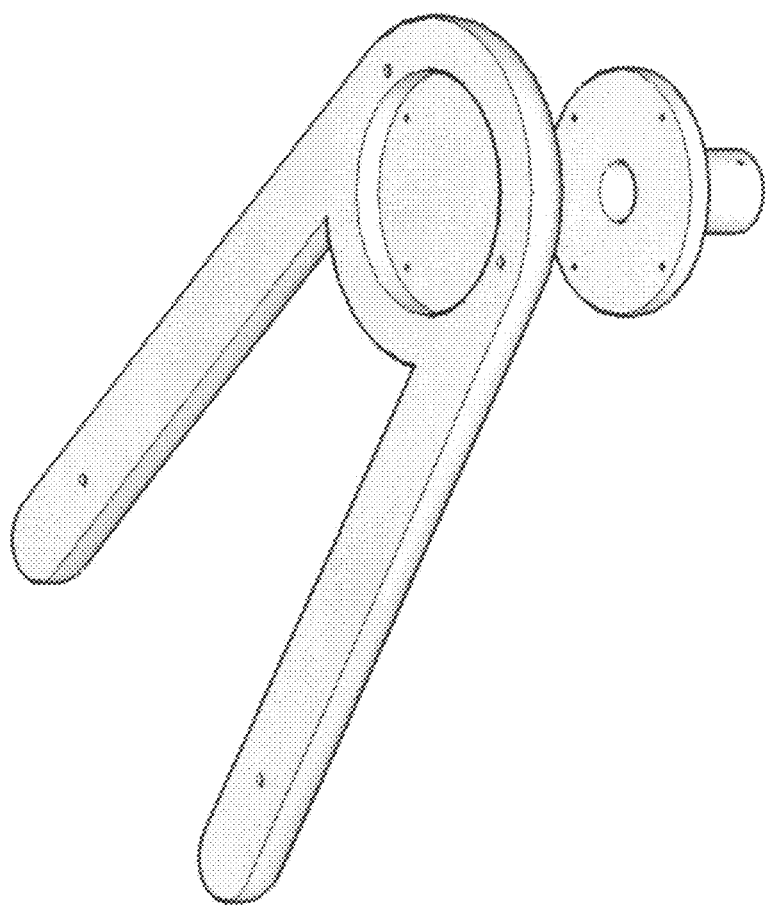
FIG. 36B is an exploded underside view of the same assembly.

As indicated in FIG. 36A, FIG. 36B and Reference 2, the base unit is a single-piece, metal or wooden part that is sized, shaped and weighted such that the said stand assembly can be supported altogether and used freely without tipping or falling. The base unit may be a round U-shape, square U-shape or V-shape piece. The base unit may be equipped with holes that are sized and positioned to match the threaded holes on the bottom of the said post flange. Bolts are used in these holes from the underside to fasten the base unit to the post flange.

Figure 37A:
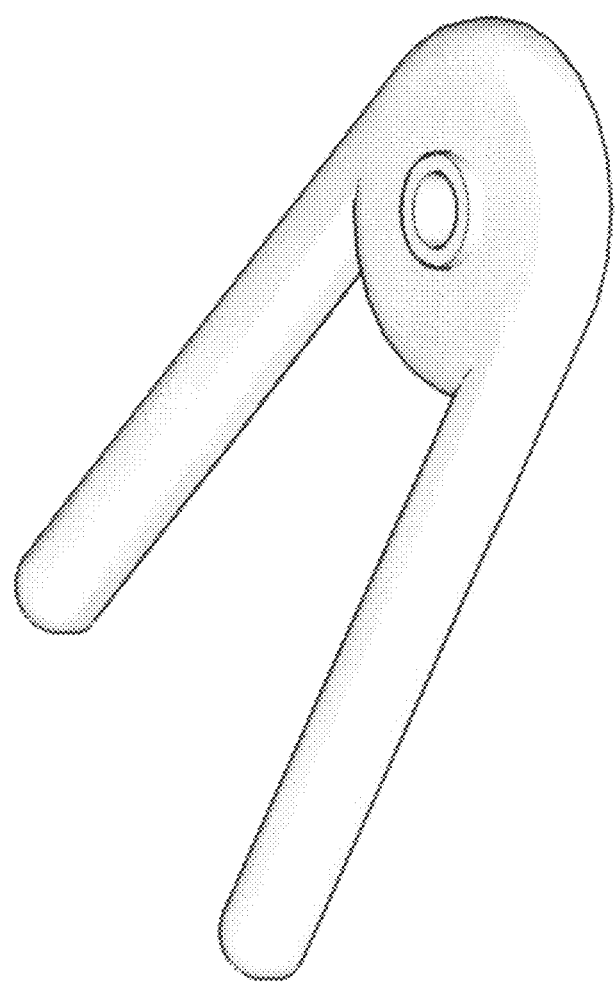
FIG. 37A is a parallel projection view of the single-piece base unit with post mounting hole.
Figure 37B:
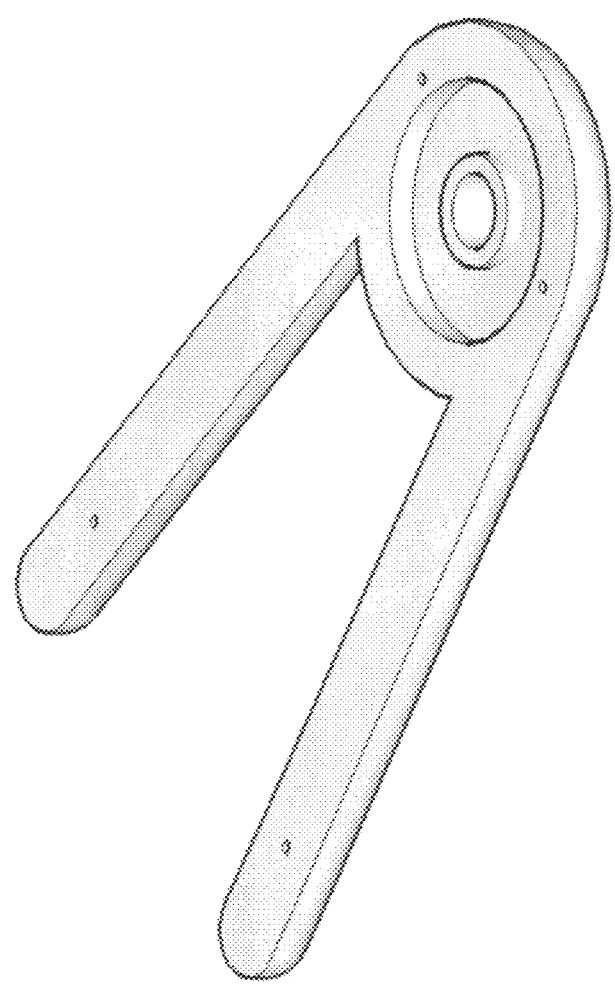
FIG. 37B is an underside view of the same assembly.

Referring to FIG. 37A and FIG. 37B, the said base unit may be equipped with a hole with raised collar rather than the said flange mounting holes to accommodate the said base post. As shown in FIG. 33, the inner collar of the base unit and the end of the post are cylinders with a very slight tapered shape such that the post can be manually wedged tightly into the base unit. The tapered end of the post is equipped with a ring with threaded hole on the flat, round end of the post and a bolt is used with a washer to fasten the post and the base unit together. In FIG. 33, the collar of the base unit is represented by the tapered outer cylinder (48).

The said base unit may also be constructed from a single-piece molded plastic part in addition to formed metal, cast metal or wood.

Board Base Unit

Figure 38A:
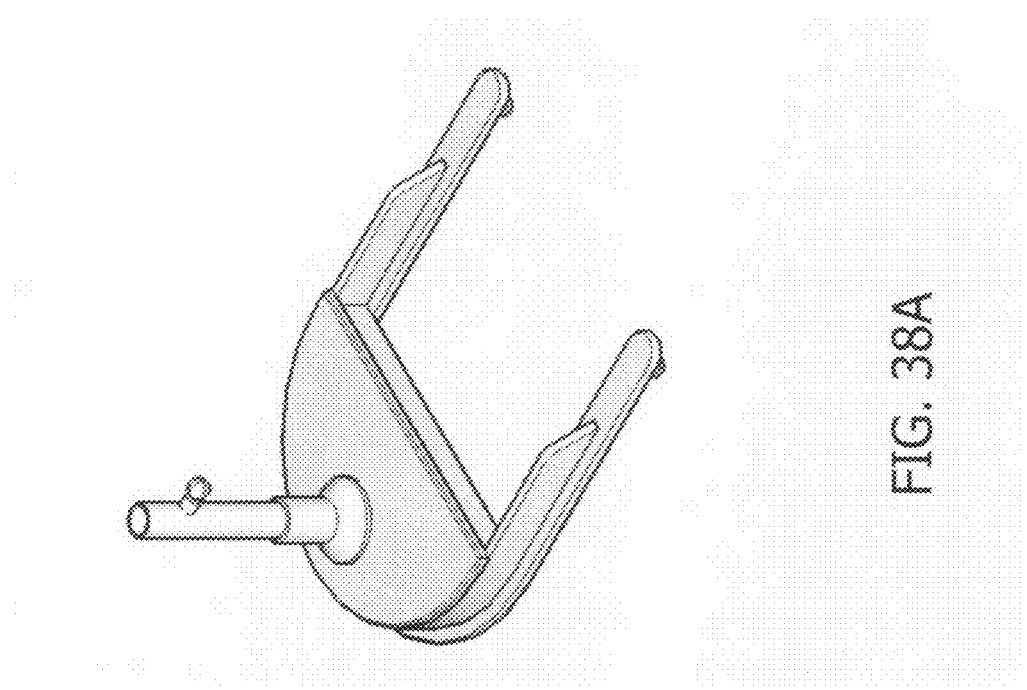
FIG. 38A is a parallel projection view of the board base assembly.
Figure 38B:
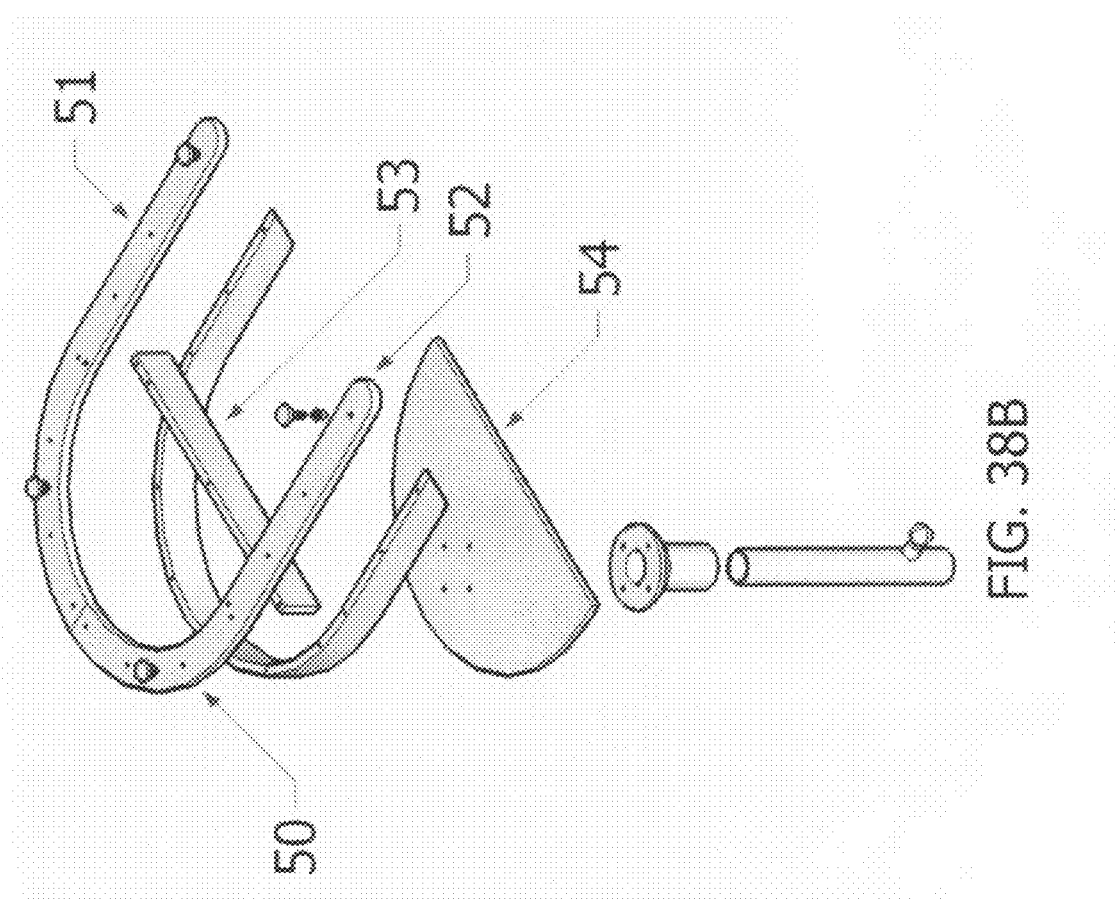
FIG. 38B is an exploded underside view of the same assembly.

As indicated in FIG. 38A, FIG. 38B and Reference 1, a left base support (50), right base support (51), a curved contour support (52), lateral support (53) and a top plate (54) may be used to construct the base unit of the base assembly. A post flange and a base post are used with the base unit to construct the base assembly.

As indicated in FIG. 38A, FIG. 38B and Reference 1, the said top plate is sufficiently thick and of stiff material such that no twisting occurs from the moment of force exerted by the post.

As indicated in FIG. 38A, FIG. 38B and Reference 1, the said post flange is fastened to the said top plate with four screws on the underside. The said base post is inserted into the said post flange and held in place with one lateral screw.

As indicated in FIG. 38A, FIG. 38B and Reference 1, the said lateral support is fastened to the said top plate using three counter-sink screws. The said contour support is also fastened to the top plate using eight counter-sink screws.

As indicated in FIG. 38A, FIG. 38B and Reference 1, the said left base support and right base support are fastened to the said contour support with seven screws each.

As indicated in Reference 1, the said left base support, right base support, a curved contour support, lateral support and the top plate are constructed from a wooden material but may also be constructed from plastic.

Base Post Bearing

Figure 39B:
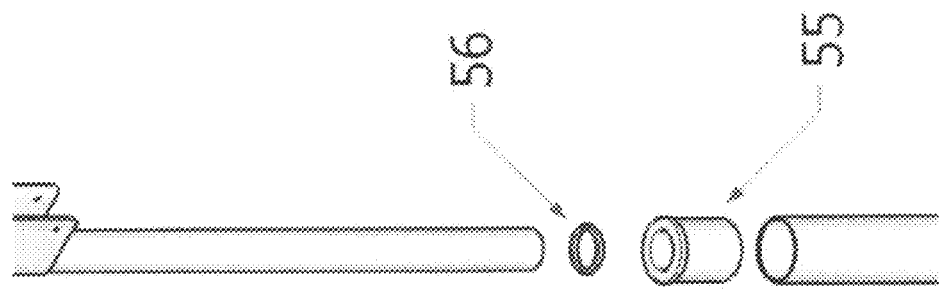
FIG. 39B is an exploded view of the same assembly.

Referring to FIG. 39A and FIG. 39B, a base post bearing (55) may be used to provide load bearing between the inner round surface of the said base post and the outer surface of the said bracket post. A washer (56) may be used provide load bearing between the top surface of the said post bearing and the bottom surface of the said bracket.

Levelers and Casters

Figure 40A:
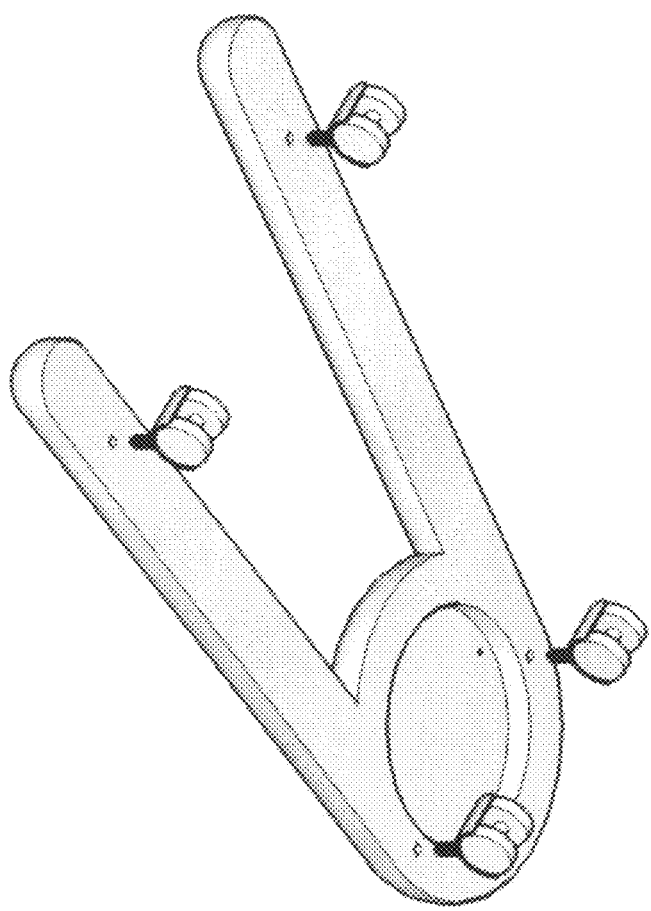
FIG. 40A is a parallel projection view showing the underside of the single-piece base unit with floor levelers.
Figure 40B:
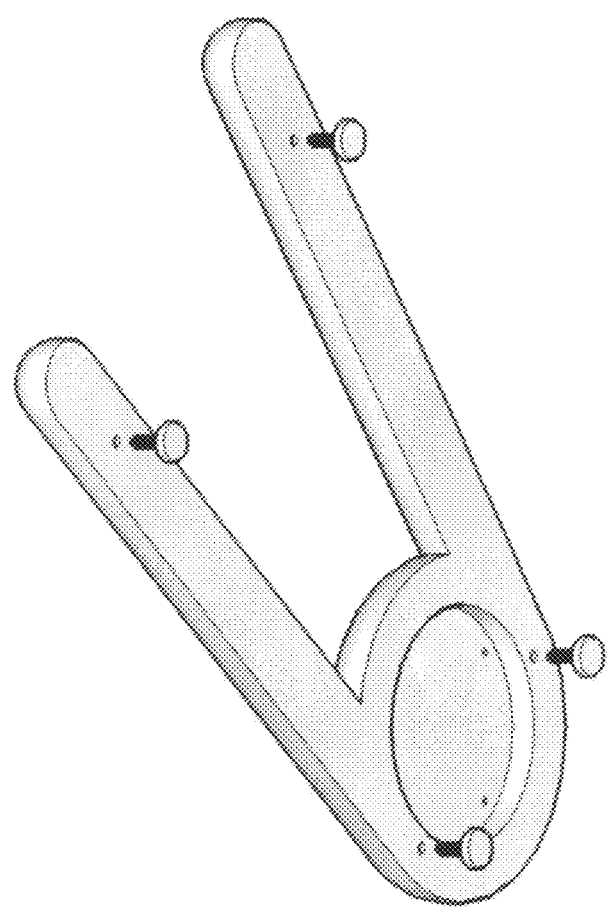
FIG. 40B is a projection view of the same assembly with casters rather than floor levelers.

As indicated in FIG. 40A, FIG. 40B and Reference 1, the said base unit is equipped with four threaded holes on its underside. The holes are sized to match the four leveling mounts and to match the four casters. The holes are positioned such that the base weight is distributed evenly amongst all four mounts.

The said base unit holes may also be regular, non-threaded holes to accommodate a press-fit insert rather that the levelers or casters. The inserts in turn can accommodate a large variety of threaded or non-threaded, levelers, casters or other types of foot rests.

Felt pads may be used under the leveling mounts to provide a soft, frictionless surface that allows the stand assembly to be moved more easily.

Base Post Spring

Figure 41:
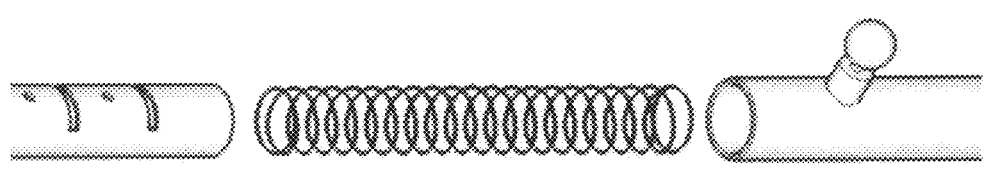
FIG. 41 is an exploded view of the base post, bracket post and spring.

As indicated in FIG. 41 and Reference 1, the said base unit may include a spring located inside the base post to provide lift to the bracket post when its height is adjusted. A cap may be inserted at the bottom end of the bracket post to provide a flat surface for the top end of the spring to rest on. The bottom end of the base post may be equipped with a threaded ring as shown in FIG. 33 to provide a flat surface for the bottom end of the spring to rest on.

The invention claimed is:

1. A mobile and adjustable table stand for a laptop computer, comprising:
 a) an articulated arm assembly apparatus, comprising:
  i) a first bracket and a second bracket both having a pair of holes as upper arm fastening means, a second pair of holes as lower arm fastening means and a third pair of holes as a post fastening means;
  ii) first, second, third and fourth shaft assemblies each comprising one sleeve, one threaded spacer, two friction washers and two screws,
   wherein the outer diameter of the threaded spacer mates with the inner diameter of the sleeve and the inner diameter of the friction washers,
   wherein the length of the threaded spacer is greater than the length of the sleeve,
   wherein each screw mates with one distal end of the threaded spacer, and
   wherein the friction washers are partially squeezed when the two screws are fully tightened;
  iii) an upper arm and a lower arm, both having first and second distal ends,
   wherein, at the first distal end, the upper arm is pivotally attached to the upper fastening means of the first bracket by the first shaft assembly,
   at the second distal end, the upper arm is pivotally attached to the upper fastening means of the second bracket by the second shaft assembly, and
   wherein, at the first distal end, the lower arm is pivotally attached to the lower fastening means of the first bracket by the third shaft assembly, and,
   at the second distal end, the lower arm is pivotally attached to the lower fastening means of the second bracket by the fourth shaft assembly,
   wherein the upper and lower arms are in parallel to each other and the first and second brackets are in parallel to each other during pivotal movement of the upper and lower arms, and
   wherein the partial squeezing of the friction washers cause resistance to the arm assembly articulation; and
  iv) a piston assembly consisting of one gas spring, and two eyelets,
   wherein the piston assembly is pivotally attached by the eyelets to the first and fourth shaft assemblies, respectively, or to the third and second shaft assemblies, respectively, and
   wherein the two eyelets are identical allowing the piston assembly to be installed in any of two directions;
 b) a tray assembly, comprising:
  i) a post having first and second distal ends and a pair of threaded holes at or near the first distal end as bracket fastening means,
   wherein the post is attached longitudinally by the first distal end to the inside surface of the first bracket with two screws; and
  ii) a tray attached perpendicularly to the second distal end of the post, wherein the size of the tray is chosen to suit a laptop computer; and
 c) a base assembly, comprising:
  i) a counterweight having a straight hole as fastening means;
  ii) a free-standing, solid base having a tapered hole as a fastening means;
  iii) an outer post having first and second distal ends,
   wherein the first distal end is tapered and equipped with a threaded hole at the extremity, and
   wherein the tapering of the outer post end and the tapering of the base hole match, allowing the outer post to be inserted into but not completely through the base;
  iv) a bolt and a washer,
   wherein the bolt and washer fasten the counterweight, the base and the outer post together;
  v) a flanged bearing having an outer diameter that mates with the inner diameter of the second distal end of the outer post; and
  vi) an inner post having first and second distal ends and a pair of threaded holes at or near the first distal end as bracket fastening means,
   wherein the inner post is attached longitudinally by the first distal end to the inside surface of the second bracket with two screws,
   wherein the outer diameter of the second distal end of the inner post mates through the inner diameter of the flanged bearing, allowing a rotational movement of the inner post, arm assembly and tray assembly together with respect to the outer post and base,
   wherein the base outer dimensions are sufficiently large to allow the entire assembly, including a laptop computer placed on the tray, to be free-standing and mobile, and
   wherein the counterweight is sufficiently heavy to allow the entire assembly, including a laptop computer placed on the tray, to be free-standing and mobile.

* * * * *